(12) United States Patent
Yuki

(10) Patent No.: US 10,530,474 B2
(45) Date of Patent: Jan. 7, 2020

(54) OPTICAL TRANSMISSION DEVICE AND OPTICAL SIGNAL GAIN CONTROL METHOD

(71) Applicant: FUJITSU LIMITED, Kawasaki-shi, Kanagawa (JP)

(72) Inventor: Masahiro Yuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/155,823

(22) Filed: Oct. 9, 2018

(65) Prior Publication Data

US 2019/0115977 A1 Apr. 18, 2019

(30) Foreign Application Priority Data

Oct. 16, 2017 (JP) .................................. 2017-200306

(51) Int. Cl.
| | |
|---|---|
| *H04B 10/079* | (2013.01) |
| *H04J 14/02* | (2006.01) |
| *H04B 10/40* | (2013.01) |
| *H04B 10/60* | (2013.01) |
| *H04B 10/50* | (2013.01) |

(52) U.S. Cl.
CPC . *H04B 10/07955* (2013.01); *H04B 10/07957* (2013.01); *H04J 14/0221* (2013.01); *H04B 10/40* (2013.01); *H04B 10/50* (2013.01); *H04B 10/60* (2013.01); *H04J 14/02* (2013.01); *H04J 14/0201* (2013.01)

(58) Field of Classification Search
None
See application file for complete search history.

(56) References Cited

U.S. PATENT DOCUMENTS

| | | | | |
|---|---|---|---|---|
| 8,625,994 B2* | 1/2014 | Archambault | ..... | H04B 14/0206 398/43 |
| 2008/0267631 A1* | 10/2008 | Collings | ............. | H04J 14/0205 398/97 |
| 2009/0162067 A1* | 6/2009 | Kobayashi | .......... | H04J 14/0204 398/79 |

FOREIGN PATENT DOCUMENTS

| | | |
|---|---|---|
| JP | 2011-254309 | 12/2011 |
| JP | 2014-007564 | 1/2014 |

* cited by examiner

*Primary Examiner* — Darren E Wolf
(74) *Attorney, Agent, or Firm* — Fujitsu Patent Center

(57) ABSTRACT

An optical transmission device includes an optical amplifier that optically amplifies a wavelength multiplexing signal which is input, a wavelength selective switch that splits, inserts, or transmits an optical signal of any wavelength of the wavelength multiplexing signal, an optical channel power monitor that detects power of each channel of the wavelength multiplexing signal which is input and the wavelength multiplexing signal which is output, and a controller that calculates an amount of change in the optical signal of each channel in which a gain of each channel between an input and an output to and from the device is steady, and adjusts an amount of attenuation of the wavelength selective switch, based on the power of each channel of the wavelength multiplexing signal that is detected by the optical channel power monitor.

12 Claims, 18 Drawing Sheets

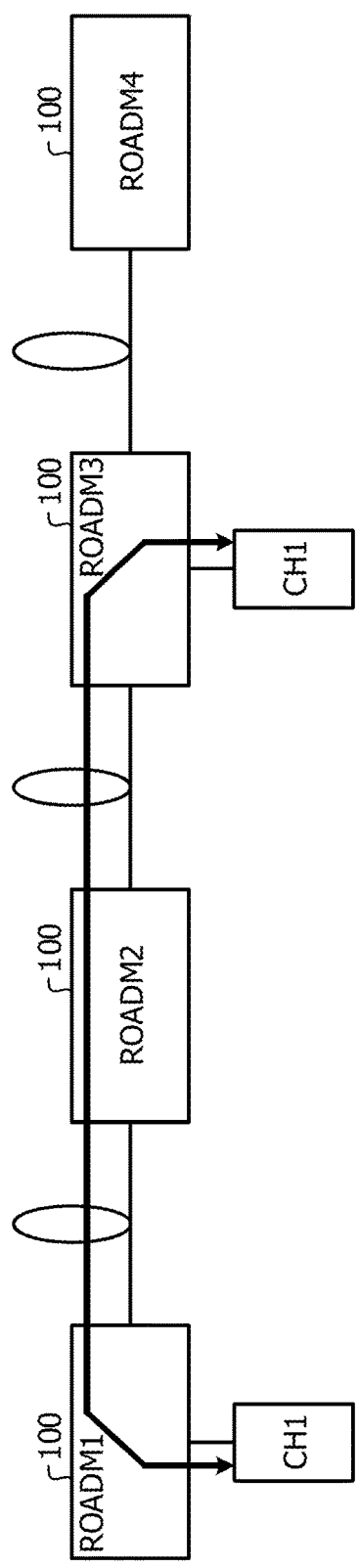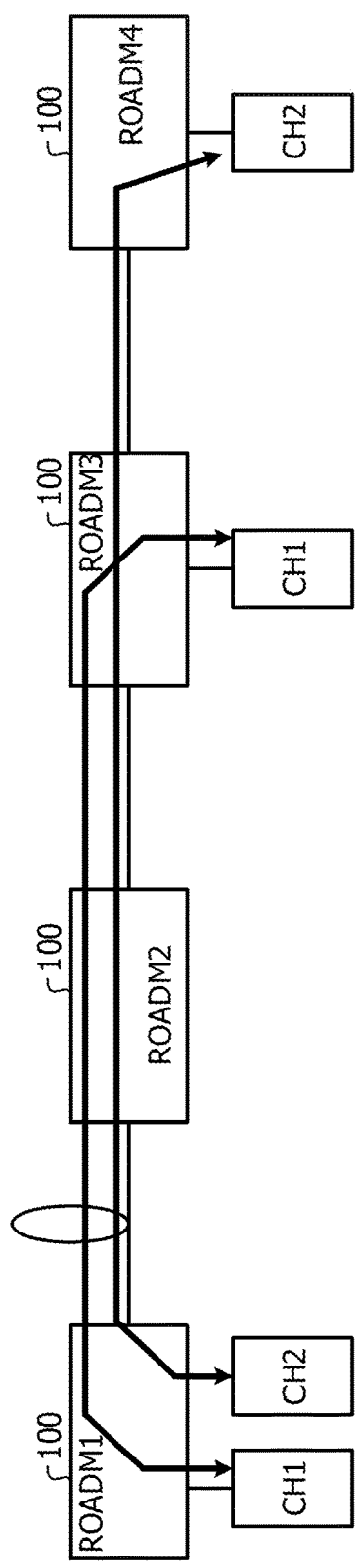

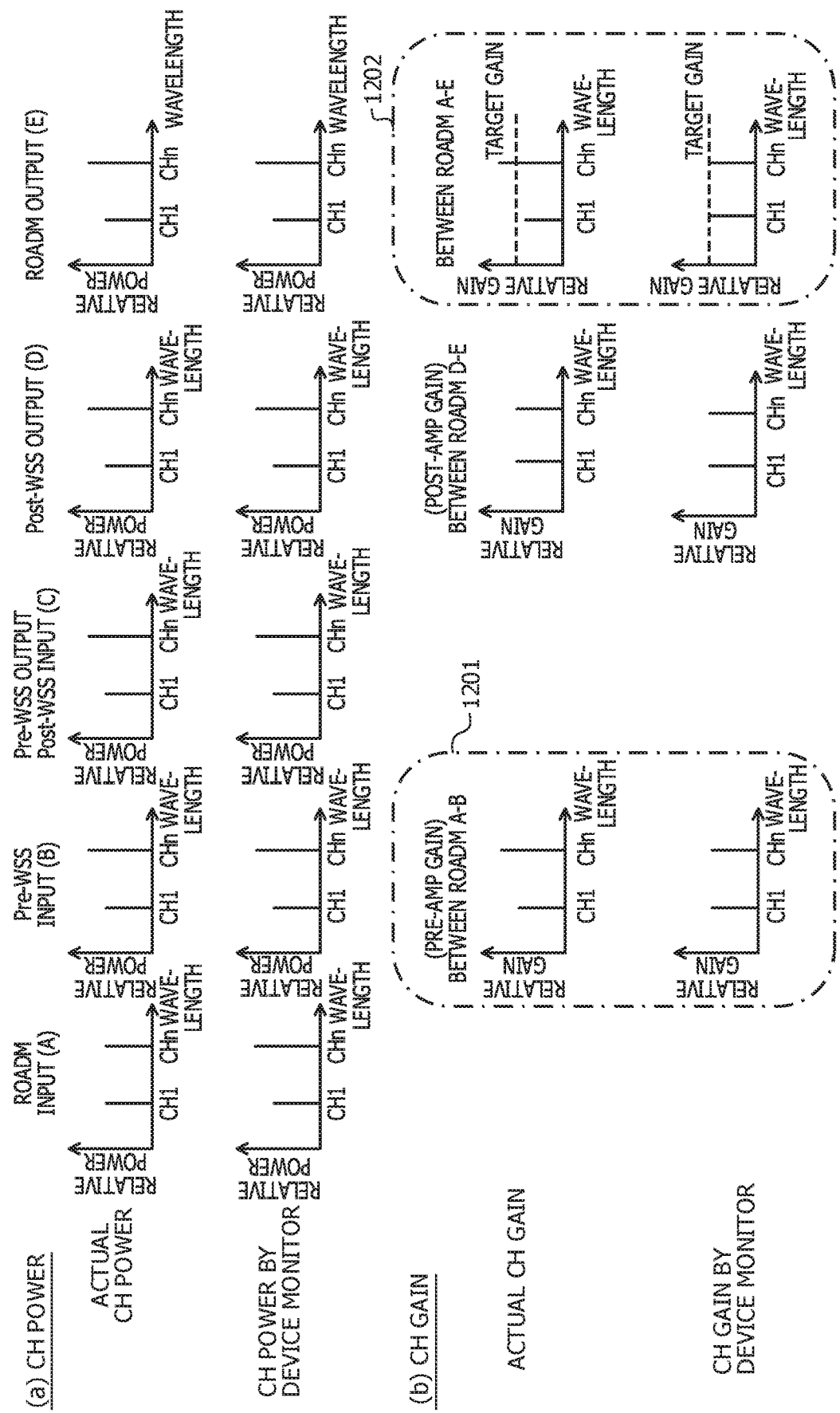

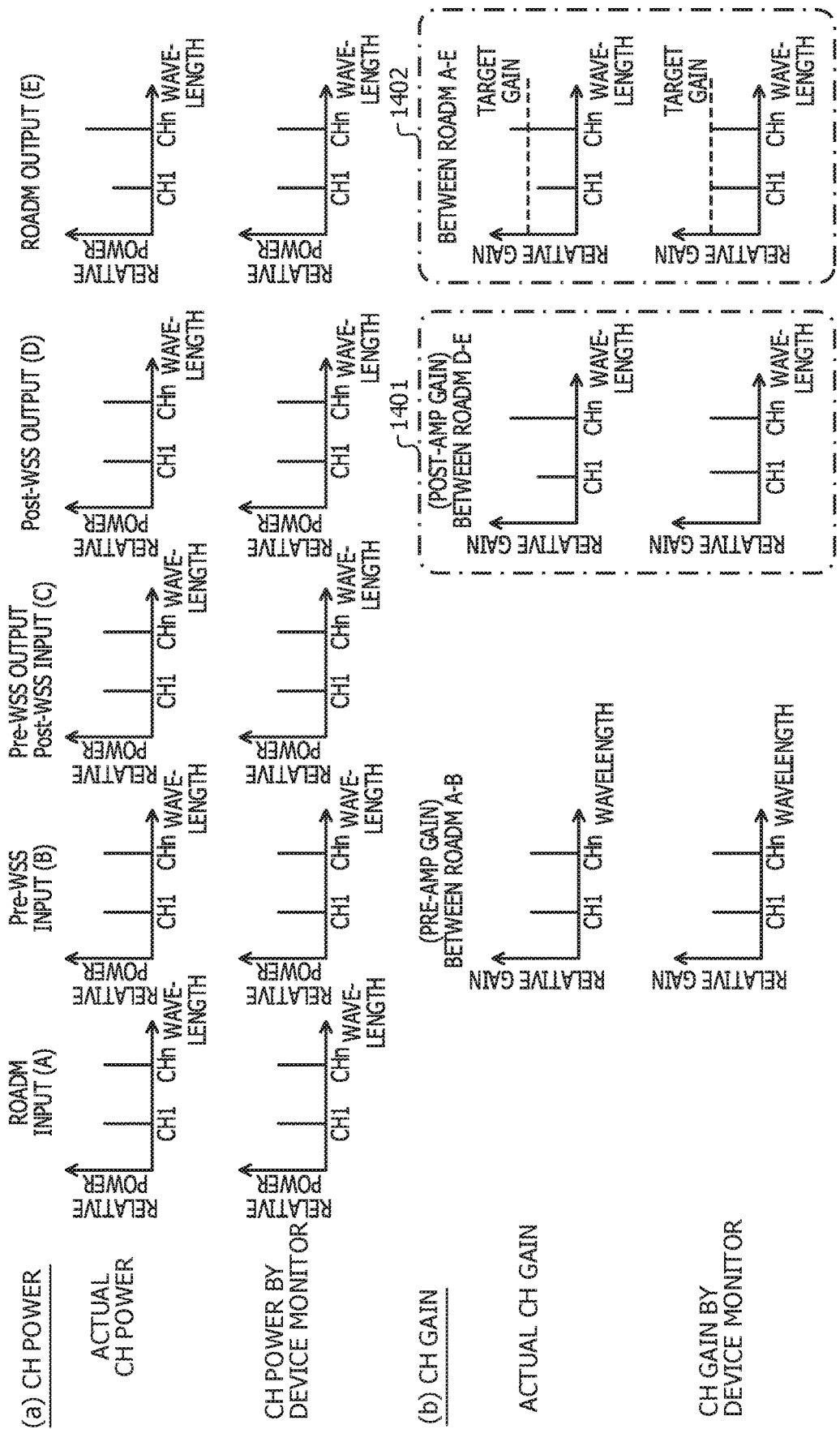

OPTICAL TRANSMISSION DEVICE AND OPTICAL SIGNAL GAIN CONTROL METHOD

CROSS-REFERENCE TO RELATED APPLICATION

This application is based upon and claims the benefit of priority of the prior Japanese Patent Application No. 2017-200306, filed on Oct. 16, 2017, the entire contents of which are incorporated herein by reference.

FIELD

The embodiments discussed herein are related to an optical transmission device and an optical signal gain control method that control a gain of a wavelength division multiplexing optical signal and transmit the controlled signal.

BACKGROUND

In order to realize a high-capacity optical communication, multiplexing of optical signals performed by wavelength division multiplexing (WDM) is widespread. In the WDM transmission system, a WDM signal in which a plurality of wavelength channels are multiplexed is transmitted. A reconfigurable optical add drop multiplexer (ROADM) is provided in each node of the WDM transmission system as an optical transmission device. The ROADM may split an optical signal of a desirable wavelength channel from the WDM signal and add the optical signal to an empty channel of the WDM signal.

The ROADM includes a pre-amplifier, a post-wavelength selective switch (WSS), a post-wavelength selective switch, a multiplexer (MUX)/demultiplexer (DMUX), a plurality of transponders, a post-amplifier, and the like.

The ROADM adjusts an output power of the amplifier and an output power of the WSS such that a WDM signal which is input becomes a target power. For example, the total power at an output terminal of the amplifier is monitored by a photo detector (PD), and the output power of the amplifier is continually feedback-controlled so as to reach a target power. The power of each wavelength at an output terminal of the WSS is monitored by an optical channel monitor (OCM), and the amount of attenuation of the WSS is continually feedback-controlled so as to reach the target power.

In the related art, a technique for controlling power of a signal output from an optical cross-connection device to be steady is disclosed. A technique for detecting a shift in wavelength transmission characteristics of a wavelength multiplexing filter by using the OCM is disclosed.

Recently, Interconnection of optical transmission devices to other companies is proposed. In a case where the optical transmission device is connected to optical transmission devices of other companies different from the own device, a format of an optical supervisory channel (OSC) and content of information are different from each other for each company, and thus, there is a limitation on transmission of control information. Accordingly, in a case of a connection between the own devices, the control information of adjacent devices, which is acquired via the OSC, for example, the number of wavelengths, a wavelength disposition, CH power of an input and an output of the WSS, attenuation (AU) of the WSS, may not be acquired from the devices of other companies.

In this case, if an output power steady control of the related art is performed, for example, in a case where the number of wavelengths varies, if each device performs an output power control at the same time, large overshoot and undershoot occur, and there is a danger of damage of the device. In order to avoid this, a method of controlling a gain of the device to be steady is considered. However, in a case of the gain steady control, only total power monitor performed by the PD may be acquired from an input and an output of the device. A gain of the optical amplifier has wavelength dependence. Accordingly, the gains of each CH may not be correctly monitored, and the gain steady control may not be performed with a high accuracy.

As such, in a case where an optical transmission device is connected to optical transmission devices of other companies, the optical transmission device such as a ROADM may not correctly monitor a gain between an input and an output, and despite the fact that the gain does not reach a target gain in actual, it is erroneously recognized that a gain reaches the target gain. In the WDM transmission system in which the ROADMs are connected in multiple stages, power deviation in each ROADM is accumulated and a signal quality deteriorates.

The followings are reference documents.
[Document 1] Japanese Laid-open Patent Publication No. 2011-254309 and
[Document 2] Japanese Laid-open Patent Publication No. 2014-007564.

SUMMARY

According to an aspect of the embodiments, an optical transmission device includes an optical amplifier that optically amplifies a wavelength multiplexing signal which is input, a wavelength selective switch that splits, inserts, or transmits an optical signal of any wavelength of the wavelength multiplexing signal, an optical channel power monitor that detects power of each channel of the wavelength multiplexing signal which is input and the wavelength multiplexing signal which is output, and a controller that calculates an amount of change in the optical signal of each channel in which a gain of each channel between an input and an output to and from the device is steady, and adjusts an amount of attenuation of the wavelength selective switch, based on the power of each channel of the wavelength multiplexing signal that is detected by the optical channel power monitor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 10A and 10B are diagrams illustrating application examples of a gain control when a CH is added to a multistage configuration of the optical transmission device according to the embodiment;

FIG. 12 is a diagram illustrating states in a case where a gain deviation occurs in a pre-amplifier of the optical transmission device of the related art;

FIG. 14 is a diagram illustrating states in a case where a gain deviation occurs in a post-amplifier of the optical transmission device of the related art;

DESCRIPTION OF EMBODIMENTS

Embodiments

Figure 1:
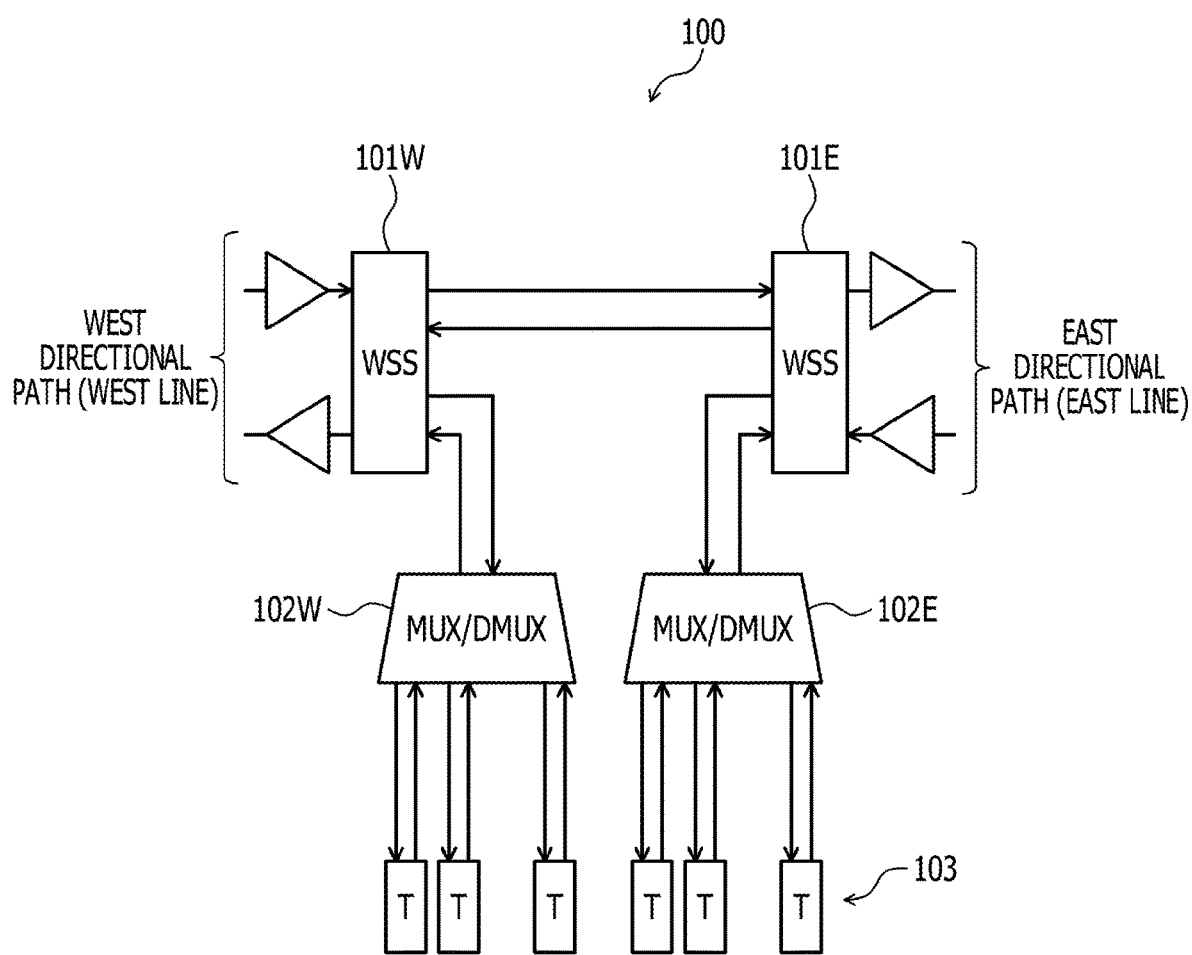
FIG. 1 is a diagram illustrating a configuration example of an optical transmission device.

FIG. 1 is a diagram illustrating a configuration example of an optical transmission device. An optical transmission device 100 illustrated in FIG. 1 is a configuration example of a ROADM, and respective WDM signals from different directional paths (WEST directional path and EAST directional path) are input.

The ROADM 100 includes wavelength selective switches (WSS) 101W and 101E, multiplexer (MUX)/demultiplexer (DMUX) 102W and 102 E, and a plurality of transponders (T) 103. The wavelength selective switch 101W processes the WDM signal input from the WEST directional path and the WDM signal output to the WEST directional path. In the same manner, the wavelength selective switch 101E processes the WDM signal input from the EAST directional path and the WDM signal output to the EAST directional path.

The wavelength selective switches 101W and 101E are connected to each other to form a through (THRU) path of the optical signal. The wavelength selective switch 101W includes a path in which an optical signal is split (DROP), and the wavelength selective switch 101E includes a path for inserting (ADD) the optical signal.

The MUX/DMUX 102W demultiplexes the WDM signal input from the WEST directional path for each wavelength channel and outputs the demultiplexed signals to the corresponding transponder 103. The MUX/DMUX 102W multiplexes the optical signals to be output to the WEST directional path and outputs the multiplexed signal to the wavelength selective switch 101W. In the same manner, the MUX/DMUX 102E demultiplexes the WDM signal input from the EAST directional path for each wavelength channel and outputs the demultiplexed signals to the corresponding transponder 103. The MUX/DMUX 102E multiplexes the optical signals to be output to the EAST directional path and outputs the multiplexed signal to the wavelength selective switch 101E.

Figure 2:
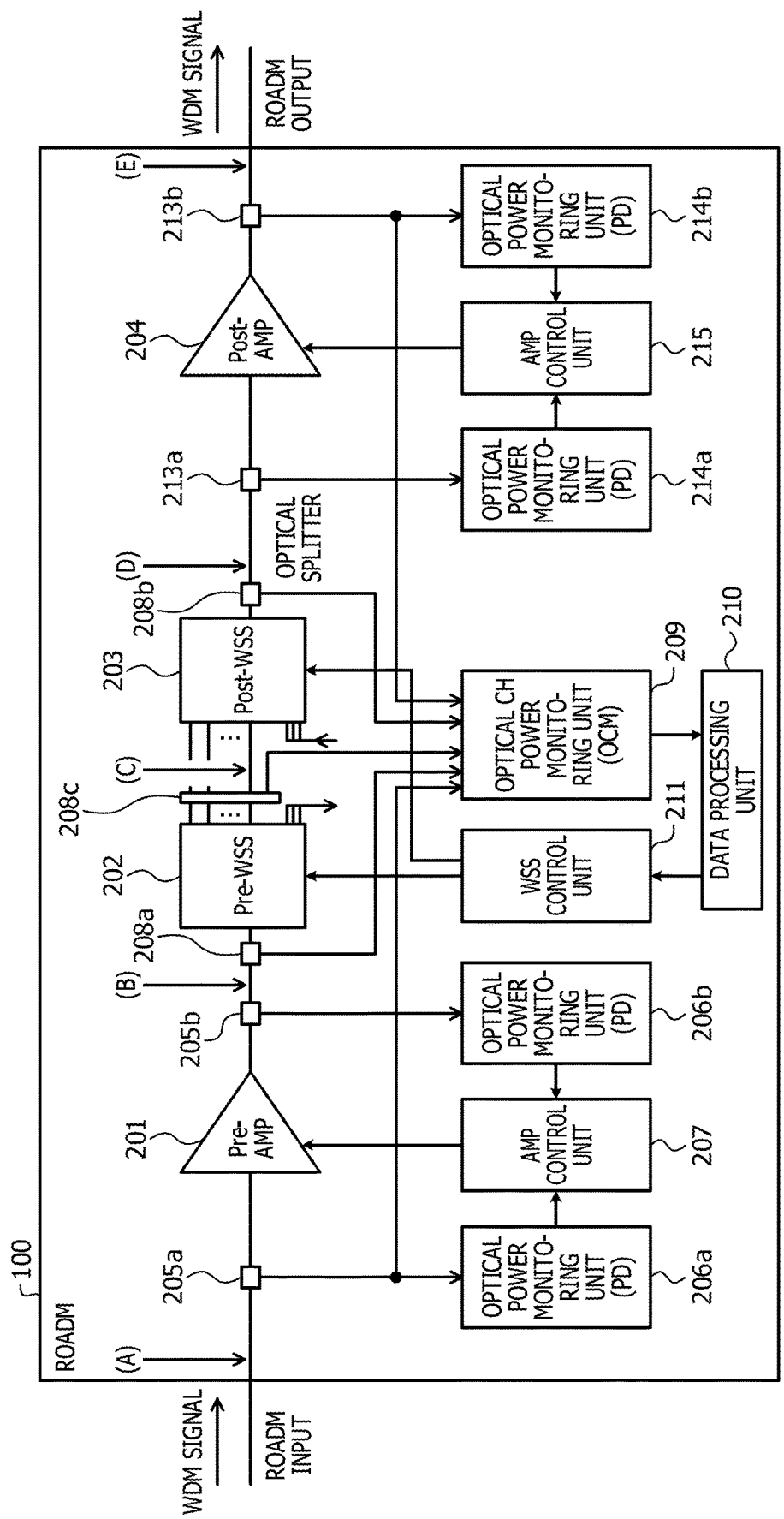
FIG. 2 is a diagram illustrating a configuration example of an optical transmission device according to an embodiment.

FIG. 2 is a diagram illustrating a configuration example of the optical transmission device according to the embodiment. FIG. 2 illustrates a configuration relating to signal processing of the WDM signal input from one directional path (for example, the WEST directional path) of the optical transmission device (ROADM) 100 illustrated in FIG. 1.

The ROADM 100 includes an optical amplifier (preamplifier: Pre-AMP) 201, a pre-WSS (Pre-WSS) 202, a post-WSS (Post-WSS) 203, and an optical amplifier (postamplifier: Post-AMP) 204 which are sequentially provided along a directional path of the WDM signal. The pre-WSS 202 corresponds to the wavelength selective switch 101W in FIG. 1, and the post-WSS 203 corresponds to the wavelength selective switch 101E in FIG. 1.

An optical splitter 205a provided at a front stage of the pre-amplifier 201 optically splits the WDM signal and outputs the split signals to an optical power monitoring unit (PD) 206a and an optical channel (CH) power monitoring unit (OCM: optical channel monitor) 209. An optical splitter 205b provided at a rear stage of the pre-amplifier 201 optically splits the WDM signal and outputs the split signal to an optical power monitoring unit (PD) 206b.

The optical power monitoring units (PDs) 206a and 206b output intensities (power) of the detected optical signals to an amplification (AMP) control unit 207. The amplification control unit 207 adjusts an output power of the pre-amplifier 201, based on the intensities of the optical signals detected by the optical power monitoring units (PD) 206a and 206b.

Optical splitters 208a, 208b, and 208c are provided at the front stage of the pre-WSS 202, at the rear stage of the post-WSS 203, and between the pre-WSS 202 and the post-WSS 203, respectively, splits optical signals, and output the split signal to an optical CH power monitoring unit (OCM) 209.

An optical splitter 213a provided at a front stage of the post-amplifier 204 optically splits the WDM signal and output the split signal to an optical power monitoring unit (PD) 214a. An optical splitter 213b provided at a rear stage of the post-amplifier 204 optically splits the WDM signal and output the split signal to an optical power monitoring unit (PD) 214b and the optical CH power monitoring unit (OCM) 209.

The optical power monitoring units (PD) 214a and 214b output intensities (power) of the detected optical signals to an amplification (AMP) control unit 215. The amplification control unit 215 adjusts an output power of the postamplifier 204, based on the intensities of the optical signals detected by the optical power monitoring units (PD) 214a and 214b.

The optical CH power monitoring unit (OCM) 209 receives optical signals of each wavelength (each CH) at the respective input and output terminals of the pre-WSS 202 and the post-WSS 203 split by the optical splitters 208a to 208c. In the embodiment, the optical signals (WDM signals) split by the optical splitters 205a and 213b are further input to the optical CH power monitoring unit (OCM) 209. The optical CH power monitoring unit (OCM) 209 detects the power of each input wavelength (each CH) of each unit and outputs the detected power to a data processing unit 210.

The data processing unit 210 continually performs a feedback control of the amount of attenuations of the pre-WSS 202 and the post-WSS 203 (WSS) via a WSS control unit 211 such that the intensities (power) of the optical signals of each wavelength detected by the optical CH power monitoring unit (OCM) 209 becomes a target power. For example, the optical CH power monitoring unit (OCM) 209 controls attenuators (ATT) of the pre-WSS 202 and the post-WSS 203 such that CH gains of the input and output WDM signals are steady with respect to the ROADM 100.

Figure 3:
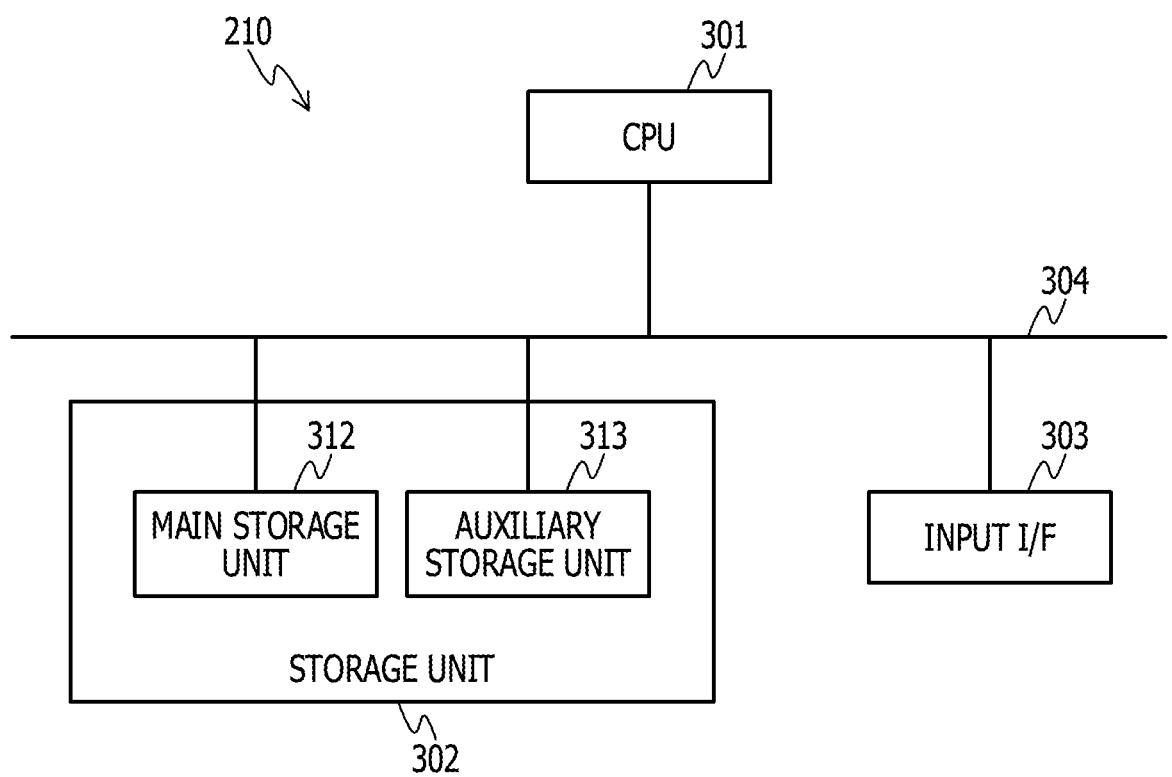
FIG. 3 is a diagram illustrating a hardware configuration example relating to data processing of the optical transmission device according to the embodiment.

FIG. 3 is a diagram illustrating a hardware configuration example relating to data processing of the optical transmission device according to the embodiment. FIG. 3 mainly illustrates a configuration example of the data processing unit 210 illustrated in FIG. 2. In FIG. 3, the data processing unit 210 includes an arithmetic processing unit (CPU: central processing unit) 301, a storage unit 302, and an input and output interface (I/F) 303. The CPU 301 to the input and output interface 303 are connected via a bus 304.

The CPU 301 is a processor that performs the entire control of the data processing unit 210. The storage unit 302 includes a main storage unit 312 and an auxiliary storage unit 313. The main storage unit 312 is a volatile memory used as a work area of the CPU 301. The volatile memory includes, for example, a dynamic random access memory (DRAM), a static random access memory (SRAM), and the like. The auxiliary storage unit 313 is a storage device that assists the main storage unit 312. The auxiliary storage unit 313 is, for example, a hard disk drive (HDD) or a solid state drive (SSD). A semiconductor memory formed by a semiconductor element, for example, the Universal Serial Bus (USB) flash drive may be used as the auxiliary storage unit 313.

The input and output I/F 303 inputs and outputs data to and from the data processing unit 210. For example, the input and output I/F performs an A/D conversion of the intensity (power) of the optical signal input from the optical CH power monitoring unit (OCM) 209 illustrated in FIG. 2 and captures the converted signal. The input and output I/F performs a D/A conversion of a control signal and outputs the converted control signal to the WSS control unit 211.

As a program stored in the storage unit 302 is executed by the CPU 301, a function of the data processing unit 210 is realized. Besides this, in the configuration including the CPU 301 illustrated in FIG. 3, other functional parts of the ROADM 100, for example, the whole of the ROADM 100 are totally controlled, and functions of the amplification control units 207 and 215 described in FIG. 2 may be performed.

Figure 4:
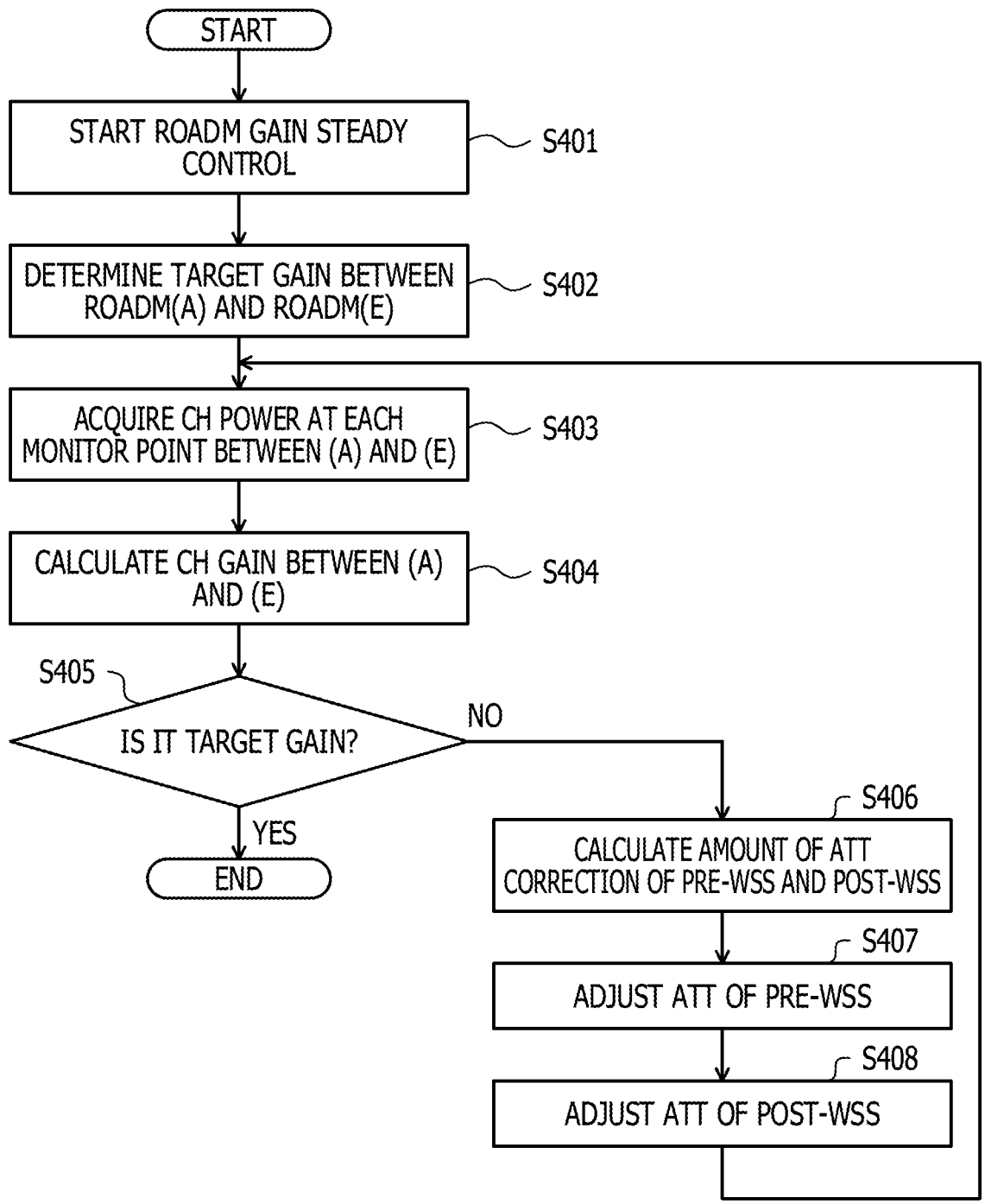
FIG. 4 is a flowchart illustrating an example of an optical signal gain control performed by the optical transmission device according to the embodiment.

FIG. 4 is a flowchart illustrating an example of an optical signal gain control performed by the optical transmission device according to the embodiment. An example of processing that is periodically performed by the CPU 301 of the data processing unit 210 described above is illustrated.

The data processing unit 210 starts a gain steady control of the ROADM 100 (step S401) and determines target gains between an input and an output of the ROADM 100 (between points (A) and (E) illustrated in FIG. 2) (step S402).

At this time, the data processing unit 210 determines the target gains of the pre-amplifier 201 to the post-amplifier 204 which are between the input and output of the device.

Next, the data processing unit 210 acquires CH power between the points (A) and (E) detected by the optical CH power monitoring unit (OCM) 209 (step S403) and calculates CH gains between the points (A) and (E) (Step S404). At this time, the optical CH power monitoring unit (OCM) 209 may acquire the CH power of each monitoring point (A), (B), (C), (D), and (E) between the points (A) and (E).

Next, the data processing unit 210 determines whether or not the CH gain calculated in step S404 is within an allowable range of the target gain (step S405). If the CH gain is within the allowable range of the target gain (step S405: Yes), the above processing ends.

Meanwhile, in a case where the CH gain exceeds the allowable range of the target gain (step S405: No), the amount of change (the amount of ATT correction) of attenuator (AU) of the pre-WSS 202 and the post-WSS 203 is calculated such that the CH gain falls within the allowable range of the target gain (step S406).

The amount of ATT correction of the pre-WSS 202 and the post-WSS 203 is set based on the following Equation (1).

$$\text{The amount of ATT changes of the pre-WSS 202} + \text{the amount of ATT changes of the post-WSS 203} = \text{monitor gain} - \text{target gain} \quad (1)$$

For example, in a case where the target gain is 10 dB and the monitor gain is 12 dB, the total amount of change of the ATT of the pre-WSS 202 and the post-WSS 203 becomes any one of, for example, 0 dB/2 dB, 1 dB/1 dB, and 2 dB/0 dB.

The data processing unit 210 outputs the amount of ATT correction of the pre-WSS 202 and the post-WSS 203 determined from among combinations of the amounts, to the WSS control unit 211. Thereby, the WSS control unit 211 performs ATT adjustment of the pre-WSS 202, based on the amount of ATT correction (step S407), and performs ATT adjustment of the post-WSS 203 (step S408). Thereafter, the data processing unit 210 returns to the processing of step S403.

In the processing example described above, the ATT adjustment of the post-WSS 203 is performed after the ATT adjustment of the pre-WSS 202, but the order may be reversed. ATTs of the pre-WSS 202 and the post-WSS 203 may be changed at the same time.

Instead of the pre-WSS 202, an optical coupler (CPL) may be used to configure the ROADM 100. In this case, the CH gain is adjusted only by the ATT adjustment for the post-WSS 203.

If the attenuators of the WSS 202 and 203 are largely changed, fluctuation of the optical power becomes large, and thus, the amount ATT which is changed once may be set to be small and a control to change the gain gradually may be performed. In the above processing, the gains between the points (A) and (E) are steady, but the gain steady control may be performed between the points (A) and (C) and between the points (C) to (E). For example, in a case where the gain steady control is performed between the points (A) and (C), the CH powers of the points (A) and (C) are detected by the optical CH power monitoring unit (OCM) 209, and the amount of ATT of the pre-WSS 202 is corrected such that the CH gains between the points (A) and (C) become steady.

Figure 5:
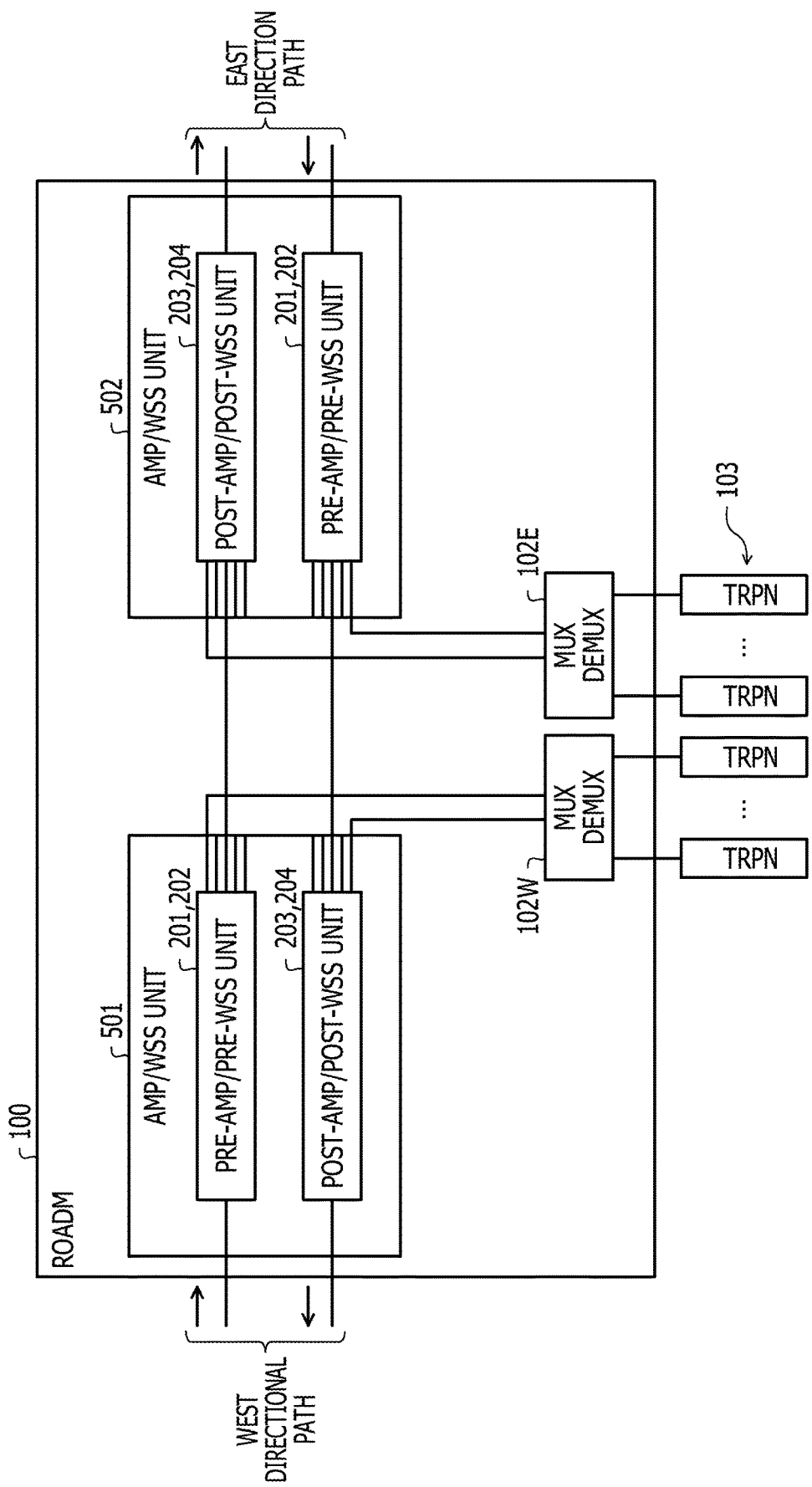
FIG. 5 is a diagram illustrating a disposition configuration example of the optical transmission device according to the embodiment (Part 1)
Figure 6:
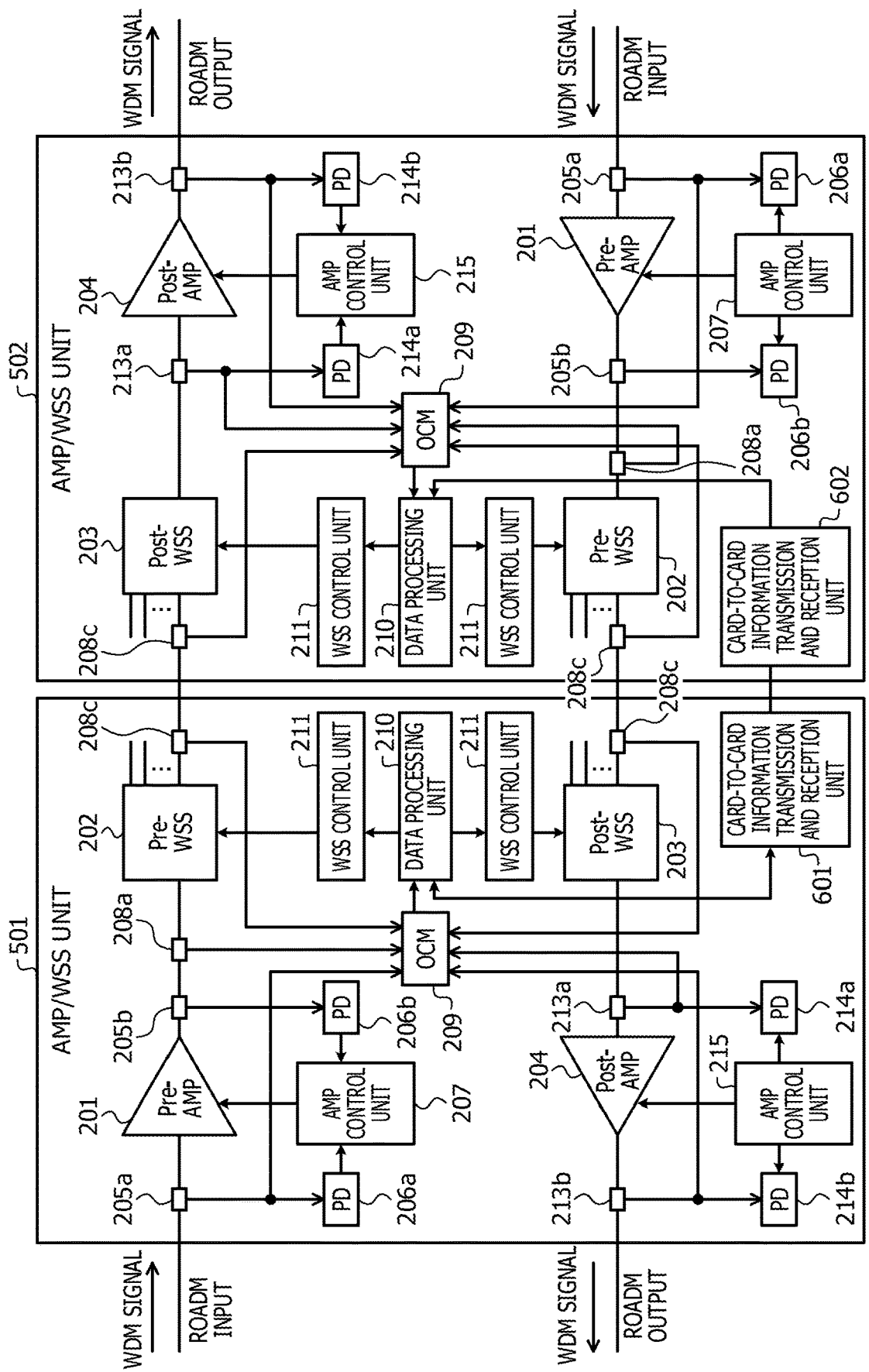
FIG. 6 is a diagram illustrating a disposition configuration example of the optical transmission device according to the embodiment (Part 2)

FIGS. 5 and 6 are diagrams illustrating a disposition configuration example of the optical transmission device according to the embodiment. In the ROADM 100 according to the embodiment, a plurality of cards may be inserted into the ROADM, and thereby, the ROADM may be configured as a unit.

FIG. 5 mainly illustrates each path of the optical signal (WDM signal). The pre-amplifier 201 and the pre-WSS 202 for inputting the optical signal from the WEST directional path, and the post-WSS 203 and the post-amplifier 204 for outputting the optical signal to the WEST directional path are provided on one card 501. In the same manner, the pre-amplifier 201 and the pre-WSS 202 for inputting the optical signal from the EAST directional path, and the post-WSS 203 and the post-amplifier 204 for outputting the optical signal to the EAST directional path are provided on one card 502.

The optical signals of the pre-WSS 202 and the post-WSS 203 pass through the through (THRU) path between the cards 501 and 502. The pre-WSS 202 on the card 501 side and the MUX/DMUX 102W are connected to each other to form a split (DROP)/insertion (ADD) path for the plurality of transponders 103. In the same manner, the pre-WSS 202 on the card 502 side and the MUX/DMUX 102E are connected to each other to form the split (DROP)/insertion (ADD) path for the plurality of transponders 103.

As such, the separate cards 501 and 502 are disposed on a pre-side and a post-side in the ROADM 100, and the cards 501 and 502 may be connected to each other.

FIG. 6 illustrates a detailed configuration example of FIG. 5, and mainly illustrates a configuration example in which a configuration relating to each function relating to the gain control illustrated in FIG. 2 is disposed on two cards 501 and 502. Card-to-card information transmission and reception units 601 and 602 are provided in the respective cards 501 and 502, respectively, and the data processing units 210 of the respective cards 501 and 502 mutually transmit and receive control information and monitor information via the card-to-card information transmission and reception units 601 and 602.

In the cards 501 and 502, the data processing units 210 controls the CH gains based on the CH powers detected by the optical CH power monitoring units (OCMs) 209 and controls the amount of ATT for the corresponding WSS 202 and 203. Thereby, it is possible to control the steady gain even for the ADD path and the DROP path of the ROADM 100.

Figure 7:
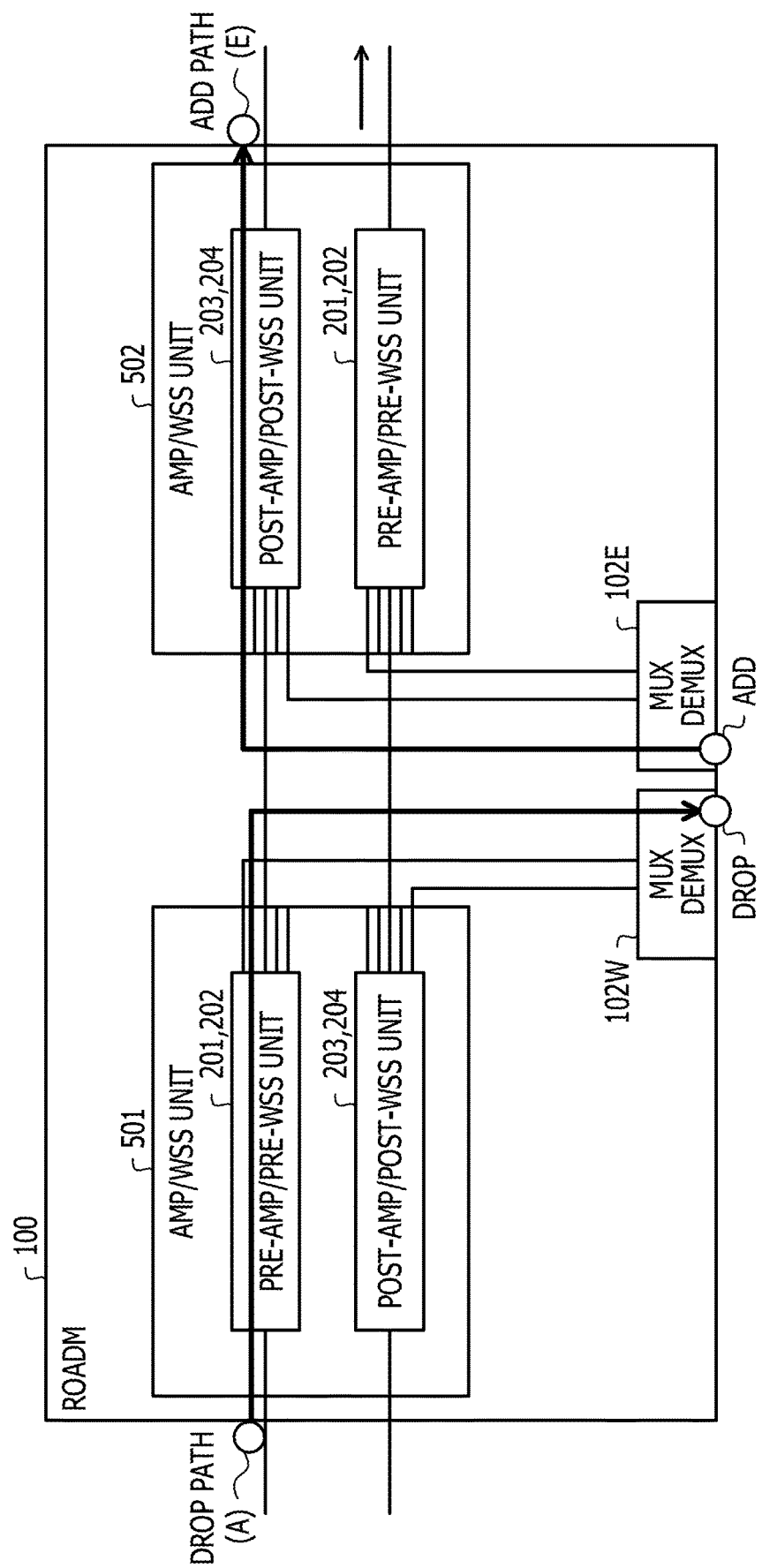
FIG. 7 is a diagram illustrating a configuration example of a channel power detection according to the embodiment.

FIG. 7 is a diagram illustrating a configuration example of channel power detection according to the embodiment. In the configuration example in which the cards 501 and 502 illustrated in FIG. 5 are provided, power of each CH may be detected by the optical CH power monitoring unit (OCM) 209 at input and output port portions of the MUX/DMUX 102W and 102E.

For example, as for the DROP path of the optical signal from the WEST directional path, the optical signal split by the optical splitter 205a (point (A) in FIG. 2) and the DROP port portion of the optical signal of the MUX/DMUX 102W are detected by the optical CH power monitoring unit (OCM) 209 of the card 501. As for the ADD path of the optical signal to the EAST directional path, the optical signal split by the optical splitter 213b (point (E) in FIG. 2) and the ADD port portion of the optical signal of the MUX/DMUX 102E are detected by the optical CH power monitoring unit (OCM) 209 of the card 502.

Figure 8:
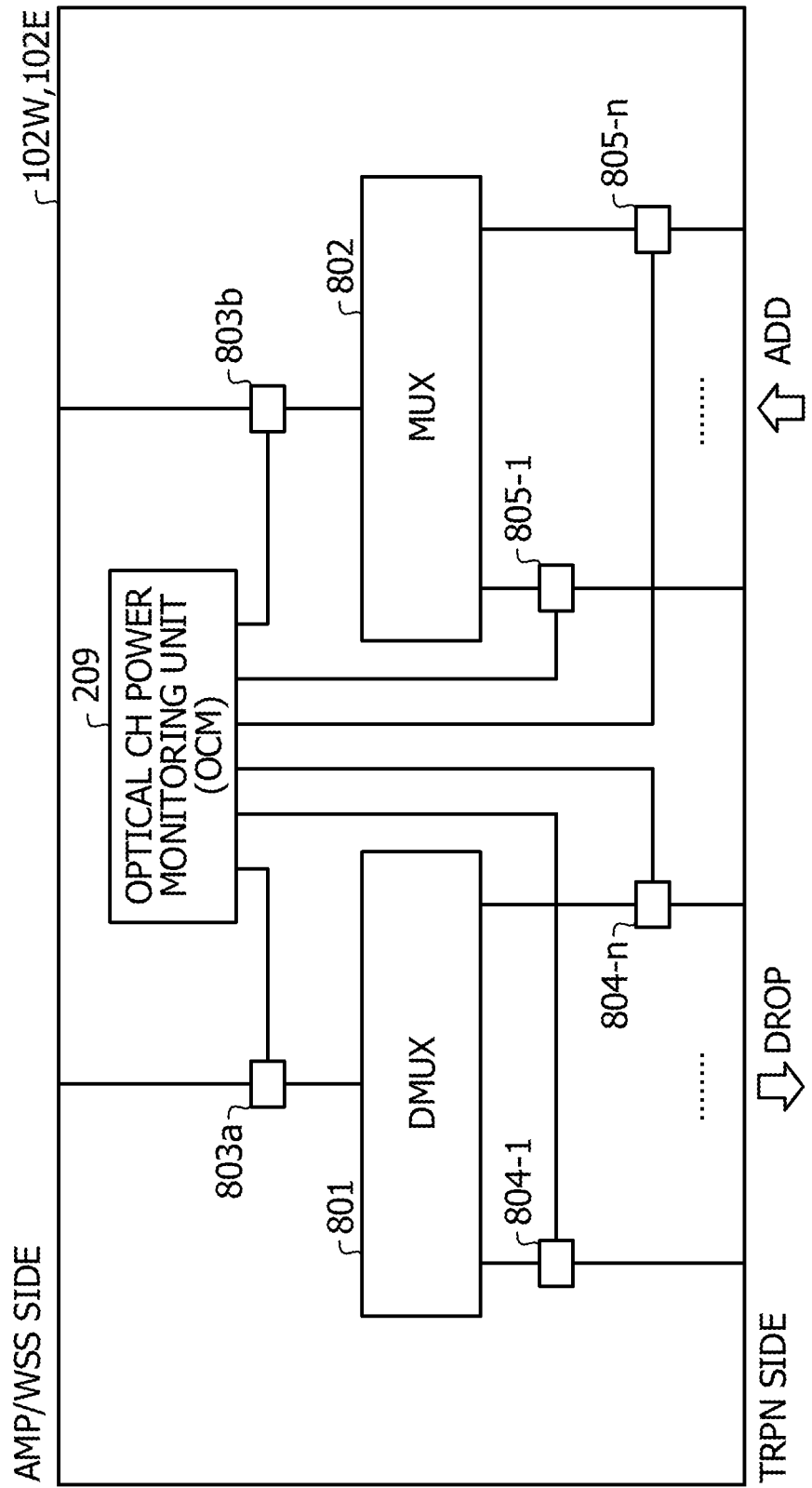
FIG. 8 is a diagram illustrating an internal configuration example of a MUX and a DMUX illustrated in FIG. 7.

FIG. 8 is a diagram illustrating an internal configuration example of the MUX/DMUX illustrated in FIG. 7. The MUX/DMUX 102W (102E) includes a DMUX (demultiplexer) 801 of the optical signal which performs DROP inside and a MUX (multiplexer) 802 of the optical signal which performs ADD.

An optical splitter 803a is provided at a front stage (AMP/WSS 501 side) of the DMUX 801, and optical splitters 804 (804-1 to 804-n) are respectively provided at a plurality of ports at a rear stage (on the transponder 103 side) of the DMUX 801. Optical splitters 805 (805-1 to 805-n) are respectively provided at a plurality of ports at the front stage (the transponder 103 side) of the MUX 802, and an optical splitter 803b is provided at the rear stage (AMP/WSS 501 side) of the MUX 802.

The CH powers of the optical signals split by the optical splitters 803a, 803b, 804, and 805 are detected by the optical CH power monitoring unit 209. The detection of the optical CH power made by the optical CH power monitoring unit 209 may be performed by any one of the following items 1 to 3. 1. The CH power of each of a plurality of ports on the transponder 103 side of the MUX/DMUX 102W (102E) is detected. 2. The CH power of each port on the AMP/WSS 501 side of the MUX/DMUX 102W (102E) is detected. 3. The CH power is detected by combining the items 1 and 2 described above.

In the above description, the gain of the ROADM 100 is adjusted by the ATT changes of the WSS 202 and 203. The embodiment is not limited to this, and the gain of the ROADM 100 may be adjusted by both the ATT performed by the WSS 202 and 203 and the gain change of the optical amplifiers 201 and 204.

In a case where the ATT performed by the WSS 202 and 203 and the gain adjustment of the optical amplifiers 201 and 204 are performed, the WSS 202 and 203 may be set to the amount of different ATT for each channel, but the gains of the optical amplifiers 201 and 204 are not set in a channel unit but are collectively set in the entire channels.

In this case, the amount of ATT changes of the WSS 202 and 203 and the amount of gain changes of the optical amplifiers 201 and 204 are adjusted based on the following Equation (2).

$$\text{The amount of ATT changes of WSS 202 and 203} + \text{the amount of gain changes of optical amplifiers 201 and 204} = \text{monitor gain} - \text{target gain} \quad (2)$$

Figure 9:
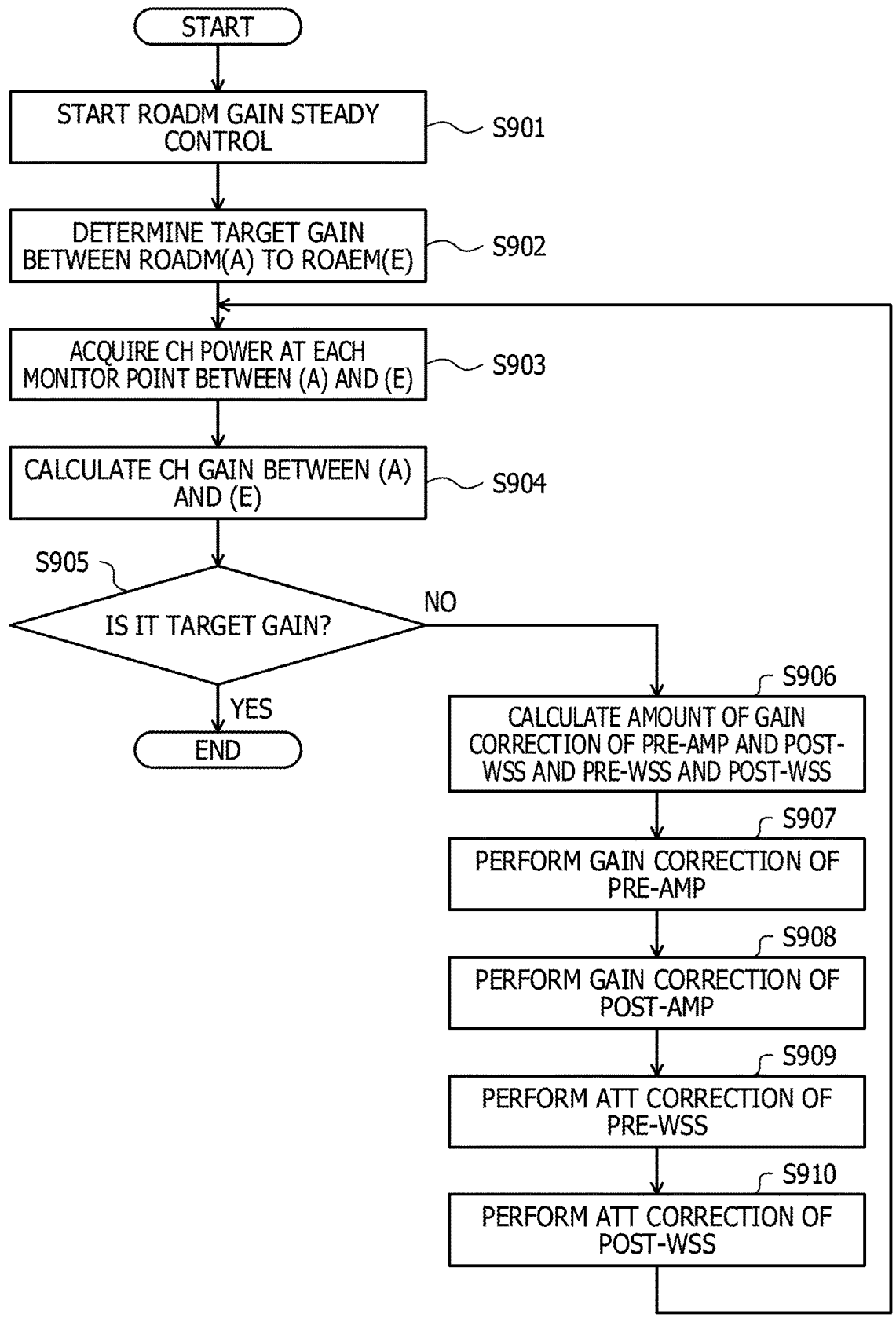
FIG. 9 is a flowchart illustrating another example of the optical signal gain control performed by the optical transmission device according to the embodiment.

FIG. 9 is a flowchart illustrating another example of the optical signal gain control performed by the optical transmission device according to the embodiment. A processing example is illustrated in which the CPU 301 of the data processing unit 210 periodically performs the ATT performed by the WSS 202 and 203 and the gain adjustment of the optical amplifiers 201 and 204 described above.

The data processing unit 210 starts s gain steady control of the ROADM 100 (step S 901) and determines a target gain between an input and an output of the ROADM 100 (between the points (A) and (E) illustrated in FIG. 2) (step S902). At this time, the data processing unit 210 determines gains of the pre-amplifier 201, the post-amplifier 204, the pre-WSS 202 and the post-WSS 203.

Next, the data processing unit 210 acquires the CH power between the points (A) and (E) detected by the optical CH power monitoring unit (OCM) 209 (step S903) and calculates the CH gains between the points (A) and (E) (step S904). At this time, the optical CH power monitoring unit (OCM) 209 may acquire the CH power of each of the monitoring points (A), (B), (C), (D), and (E) between the points (A) and (E).

Next, the data processing unit 210 determines whether or not the CH gain calculated in step S904 is within an allowable range of a target gain (step S905). If the CH gain is within the allowable range of the target gain (step S905: Yes), the above processing ends.

Meanwhile, in a case where the CH gain exceeds the allowable range of the target gain (step S905: No), the amount of gain correction within the allowable range of the target gain is calculated (step S906). At this time, the amount of gain changes of the pre-amplifier 201 and the post-amplifier 204, the pre-WSS 202, and the amount of change (the amount of ATT correction) of the attenuator (ATT) of the pre-WSS 202 and the post-WSS 203 are calculated.

At this time, the amount of gain changes of the pre-amplifier 201 and the post-amplifier 204, and the amount of change (the amount of ATT correction) of the attenuator (ATT) of the pre-WSS 202 and the post-WSS 203 are calculated based on Equation (2) described above. For example, the pre-amplifier 201, the post-amplifier 204, the pre-WSS 202, and the post-WSS 203 perform a predetermined distribution of the amount of gain adjustment. For example, in a case where the target gain is 10 dB and the monitor gain is 12 dB, the amount of difference 2 dB is distributed by the pre-amplifier 201, the post-amplifier 204, the pre-WSS 202, and the post-WSS 203.

The data processing unit 210 performs the gain correction of the pre-amplifier 201 and the post-amplifier 204 determined by any one of the above combinations to the WSS control unit 211 (steps S907 and S908). ATT correction of the pre-WSS 202 and the post-WSS 203 is performed (steps S909 and S910). Thereafter, the data processing unit 210 returns to the processing of step S903.

Application Example of Gain Control when CH is Added in Multistage ROADM

FIGS. 10A and 10B are diagrams illustrating application examples of a gain control when a CH is added in a multistage configuration of the optical transmission device according to the embodiment. FIGS. 10A and 10B illustrate an example in which four ROADMs 100 described above are connected in multiple stages and CH2 is added after CH1 is operated.

As illustrated in FIG. 10A, it is assumed that CH1 is initially operated in the path of a ROADM1 100 to a ROADM3 100. In this case, each of the ROADM1 100 to the ROADM3 100 in the path of CH1 starts with an output power steady control and is shifted to the gain steady control described above (see FIG. 4).

Next, as illustrated in FIG. 10B, it is assumed that CH2 is added to the path of the ROADM1 100 to a ROADM4 100. In this case, the ROADM1 100 to the ROADM3 100 operating in CH1 continuously perform the gain steady control for CH1, start with output power steady control for the added CH2, and then, is shifted to the gain steady control described above (see FIG. 4). For the added CH2, the ROADM4 100 starts with the output power steady control, and thereafter, the ROADM4 100 is shifted to the gain steady control described above (see FIG. 4).

As such, ROADM 100 starts under the output power steady control and the power of the output channel of the ROADM 100 reaches the target range, and thereafter, ROADM 100 may be switched to the gain steady control. In a case where CH2 is added during operation of CH1, the ROADM 100 makes CH2 start under the output power steady control while CH1 operates in the gain steady control, and then, is switched to the gain steady control. At this time, due to the addition of CH2, gain wavelength characteristics of the amplifiers 201 and 204 may change and the gain change of CH1 may occur. However, due to the above shifting, the gain of CH1 may also be held steady.

Figure 11:
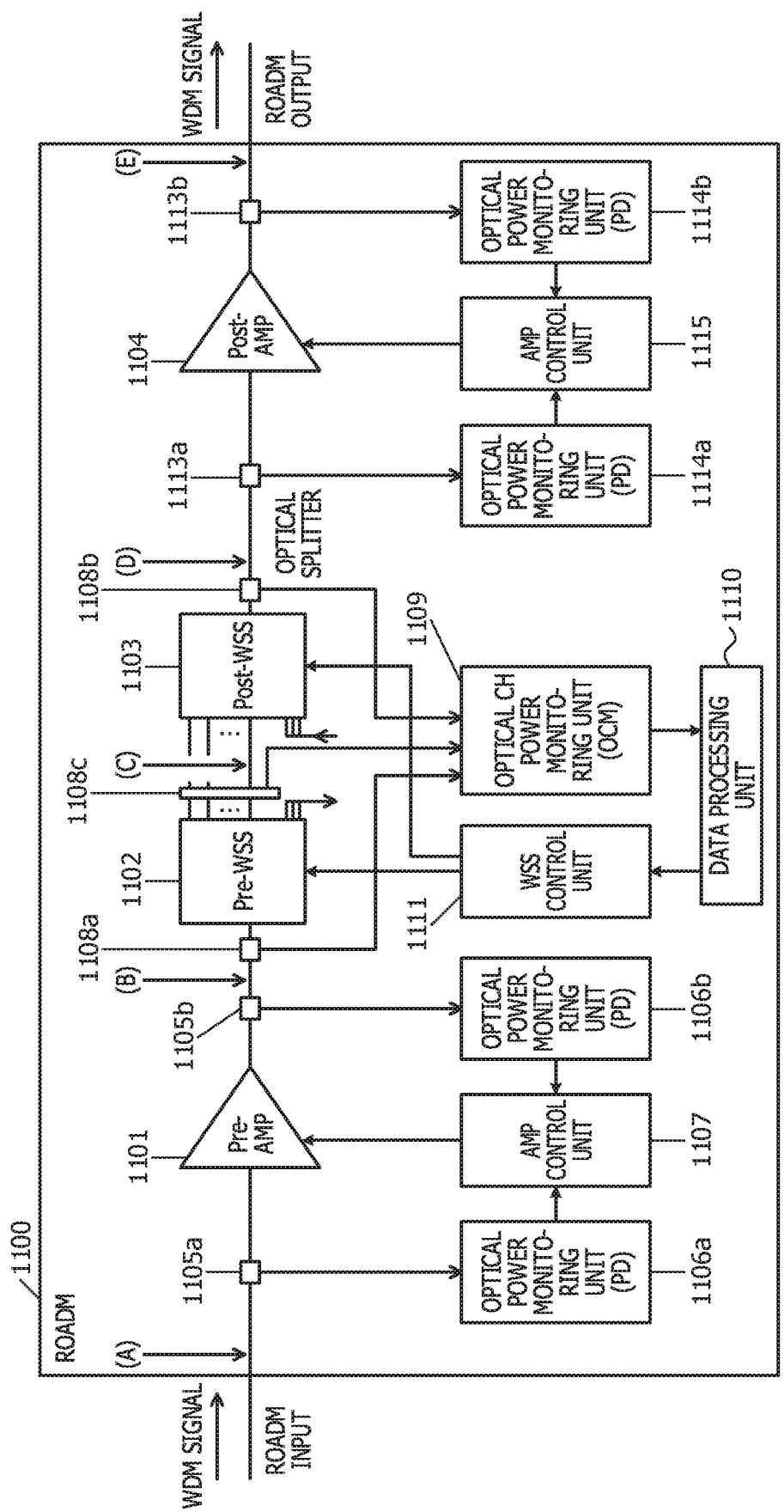
FIG. 11 is a diagram illustrating a configuration example of an optical transmission device of the related art.

Comparison between Related Art and Embodiment Hereinafter, comparison between the related art and the above-described embodiment will be made. FIG. 11 is a diagram illustrating a configuration example of an optical transmission device (ROADM) of the related art. The ROADM 1100 of the related art illustrated in FIG. 11 includes the respective configuration units such as a pre-amplifier 1101, a post-amplifier 1104, a pre-WSS 1102, and a post-WSS 1103 in the same manner as in the embodiment (see FIG. 2). Reference numerals or symbols of the respective components in FIG. 11 are attached to numbers corresponding to the reference numerals or symbols of the respective components of the embodiment (see FIG. 2).

In the related art, as illustrated in FIG. 11, an optical CH power monitoring unit (OCM) 1109 detects only optical signals at an input terminal and an output terminal of WSSs 1102 and 1103 (points (B) and (C)). For example, the related art is different from the embodiment in that the optical CH power monitoring unit (OCM) 1109 does not detect the optical signals at the points (A) and (B) of the embodiment.

FIG. 12 is a diagram illustrating states in a case where a gain deviation occurs in the pre-amplifier of the optical transmission device of the related art. In a case where the gain deviation occurs in the pre-amplifier 1101, the CH power (a vertical axis denotes a relative power between CHs) at the respective points (A) to (E) illustrated in FIG. 12($a$) and the CH gain (a vertical axis denotes a relative gain between CHs) illustrated in FIG. 12($b$) are obtained.

It is assumed that a gain deviation occurs in the pre-amplifier 1101. In this case, in the "actual CH power" of FIG. 12($a$), even if CH1 and CHn are the same at the point (A) of an input of the ROADM 1100 in FIG. 12($a$), relative powers of CH1 and CHn are different from each other at the point (B) of the pre-WSS 1102 after an output of the pre-amplifier 1101.

Accordingly, the actual CH powers of CH1 and CHn are different from each other at the points (B) to (E) in FIG. 12($a$), and the "CH powers by device monitor" are also different from each other at the points (B) to (E).

In the related art, the relative gains differ from each other between CH1 and CHn in the "actual CH gain" in FIG. 12($b$), but the CH gain deviation occurring between the pinots (A) and (B) of the ROADM 1100 deviation may not be correctly detected in the "CH gain by device monitor". In the "device monitor" between the points (A) and (B), the optical power monitoring units (PD) 1106$a$ and 1106$b$ illustrated in FIG. 11 detect the total power without separating CH1 and CHn. Accordingly, the amplification control unit 1107 may not correctly detect the CH gain deviation between CH1 and CHn (reference numeral 1201 part).

It is assumed that the "actual CH gains" in FIG. 12($b$) are the same between the points (D) and (E) corresponding to the post-amplifier 1104. However, if viewing between the points (A) and (E), the CH gain actually deviates from a target gain (dotted line), but the deviation may not be detected in the "CH gain by device monitor" (reference numeral 1202 part). Accordingly, CH1 is excessively output, and CHn is insufficient in output sometimes, as the "actual CH gain" output by the ROADM 1100.

Figure 13A:
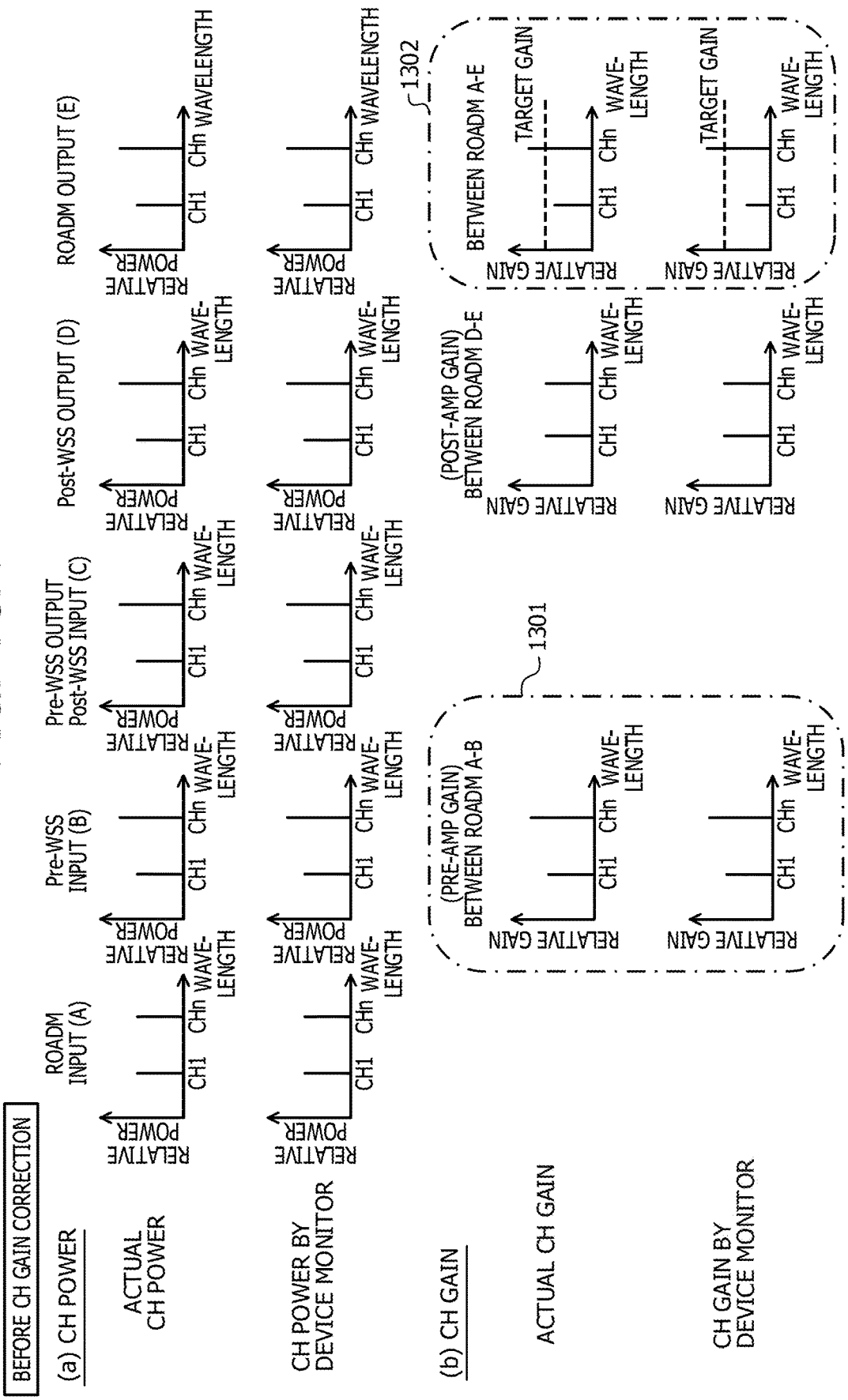
FIG. 13A is a diagram illustrating states in a case where a gain deviation occurs in a pre-amplifier of the optical transmission device according to the embodiment (Part 1)
Figure 13B:
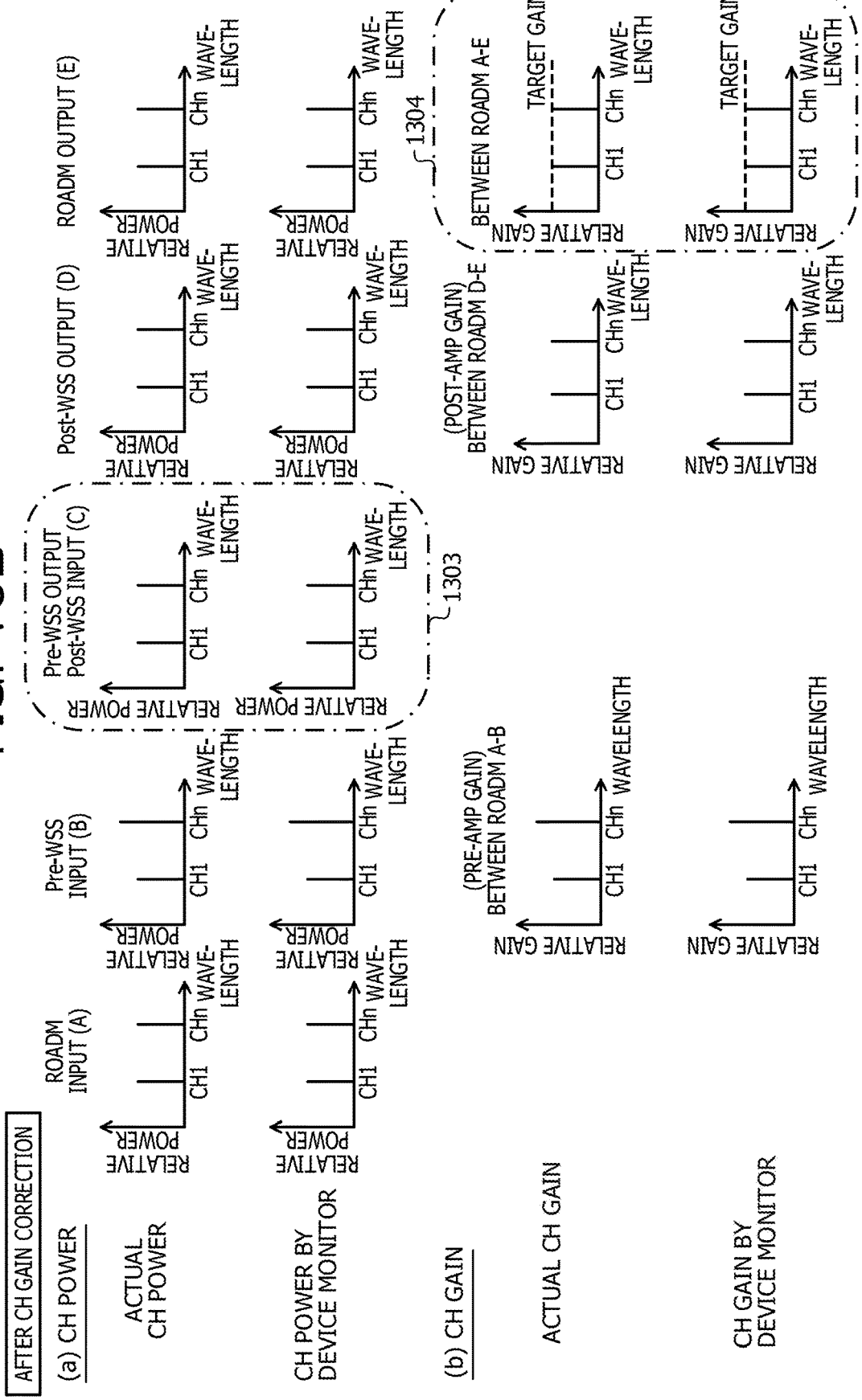
FIG. 13B is a diagram illustrating states in a case where a gain deviation occurs in the pre-amplifier of the optical transmission device according to the embodiment (Part 2)

FIGS. 13A and 13B are diagrams illustrating states in a case where the gain deviation occurs in the pre-amplifier of the optical transmission device according to the embodiment. FIG. 13A illustrates states before the CH gain is corrected, and FIG. 13B illustrates states after the CH gain is corrected.

According to the embodiment, in the state before the CH gain is corrected in FIG. 13A, the CH gain deviation occurring in the pre-amplifier 201 between the points (A) and (B) may be correctly detected in the "CH gain by device monitor" in FIG. 13A(b) (reference numeral 1301 part). In the "device monitor" between the points (A) and (B), CH1 and CHn may be detected for each CH by the optical CH power monitoring unit (OCM) 209 illustrated in FIG. 2. Thereby, due to the "CH gain by device monitor" between the points (A) and (E) of the ROADM 100, deviation of CH1 and CHn from the target gain (dotted line) may be detected (reference numeral 1302 part).

Thereafter, in the embodiment, in states after the CH gains of FIG. 13B are corrected, the gain correction is performed by the ATT of the pre-WSS 202 at the point (C) in FIG. 13B(a) (reference numeral 1303 part). Thereby, CH1 and CHn may coincide with the target gain (dotted line) as the "actual CH gain" at the points (A) to (E) in FIG. 13B(b). The relative gains of CH1 and CHn may be output in the same state as the "actual CH gain" output by the ROADM 1100 (reference numeral 1304 part).

FIG. 14 is a diagram illustrating states where the gain deviation occurs in the post-amplifier of the optical transmission device of the related art. In a case where the gain deviation occurs in the post-amplifier 1104, the CH power (a vertical axis denotes a relative power between CHs) at the respective points (A) to (E) illustrated in FIG. 14(a), the CH gain (a vertical axis denotes a relative gain between CHs) illustrated in FIG. 14(b) is obtained.

It is assumed that a gain deviation occurs in the post-amplifier 1104. In this case, the "actual CH power" of FIG. 14(a), even if CH1 and CHn are the same at the points (A) to (D) of an input of the ROADM 100, relative powers of CH1 and CHn are different from each other at the point (E) after an output of the post-amplifier 1104.

In the related art, the relative gains differ from each other between CH1 and CHn in the "actual CH gain" in FIG. 14(b), but the CH gain deviation occurring between the pinots (D) to (E) of the ROADM 1100 deviation may not be correctly detected in the "CH gain by device monitor". In the "device monitor" between the points (D) and (E), the optical power monitoring units (PD) 1114a and 1114b illustrated in FIG. 11 detect the total power without separating CH1 and CHn. Accordingly, the amplification control unit 1107 may not correctly detect the CH gain deviation between CH1 and CHn (reference numeral 1401 part).

It is assumed that the "actual CH gains" in FIG. 14(b) are the same between the points (A) and (B) corresponding to the pre-amplifier 1101. However, if viewing between the points (A) and (E), the CH gain actually deviates from a target gain (dotted line), but the deviation may not be detected in the "CH gain by device monitor" (reference numeral 1402 part). Accordingly, CH1 is insufficient in output, and CHn is excessively output sometimes, as the "actual CH gain" output by the ROADM 1100.

Figure 15A:
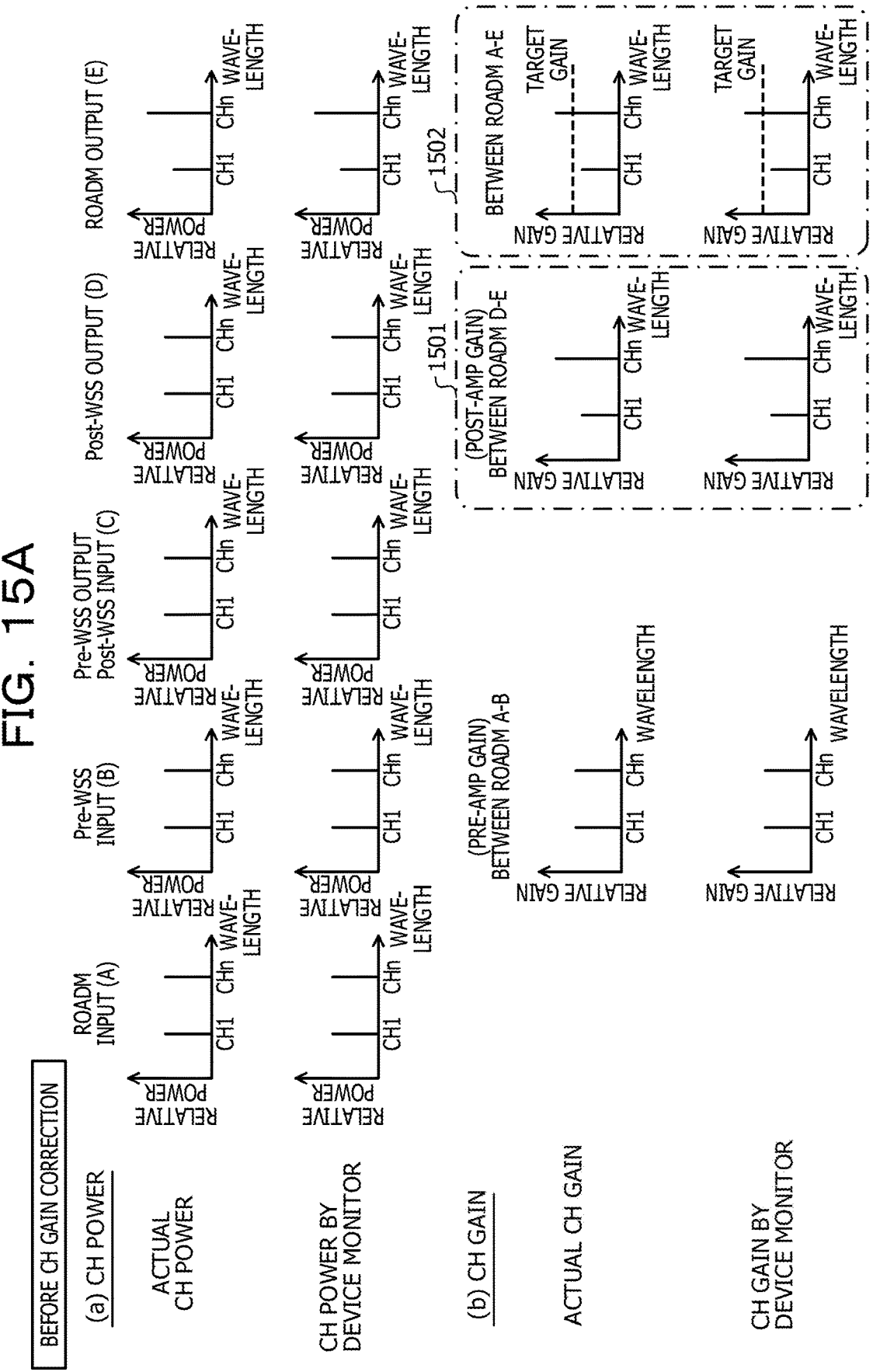
FIG. 15A is a diagram illustrating states in a case where a gain deviation occurs in the post-amplifier of the optical transmission device according to the embodiment (Part 1)
Figure 15B:
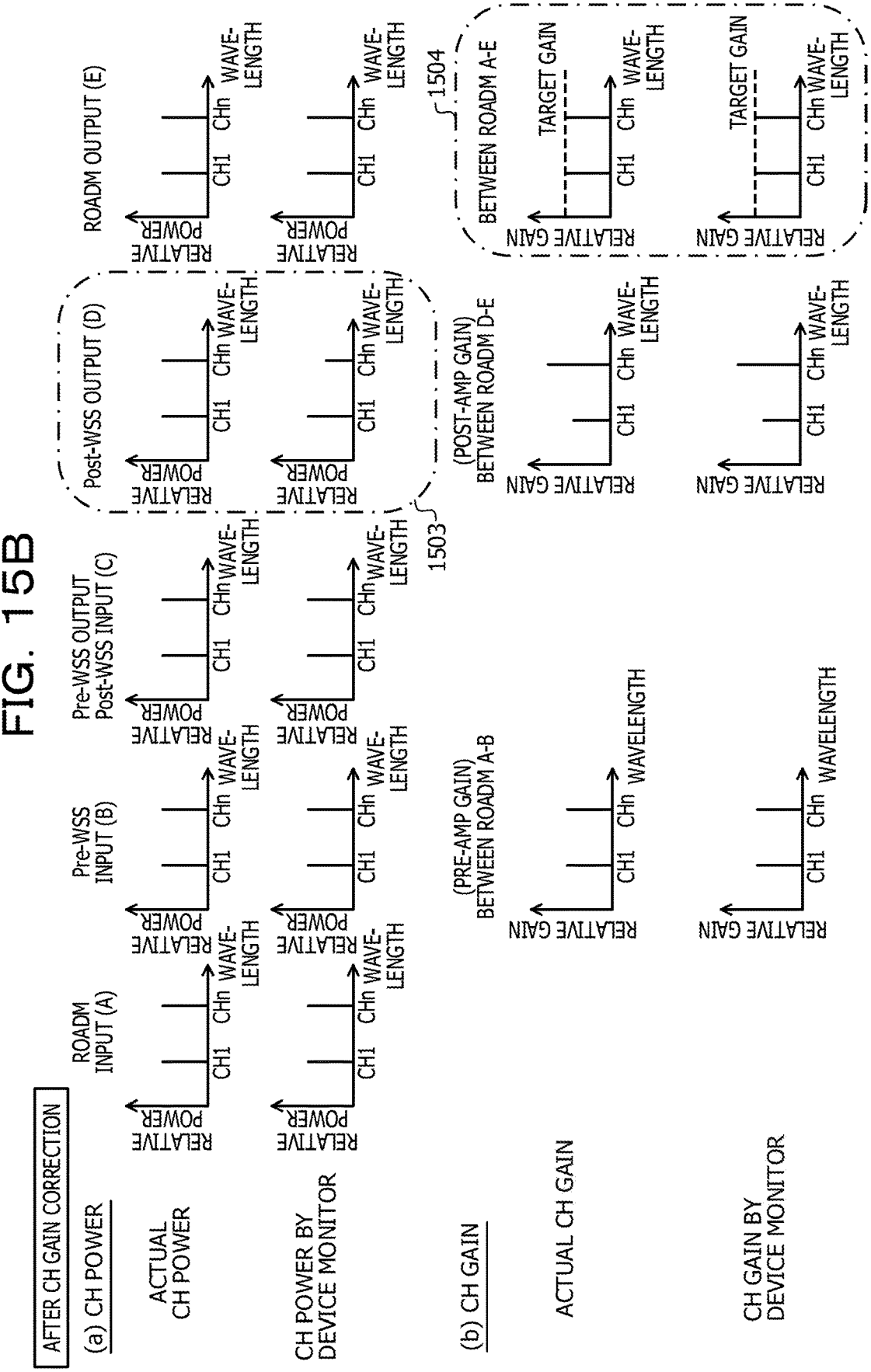
FIG. 15B is a diagram illustrating states in a case where a gain deviation occurs in the post-amplifier of the optical transmission device according to the embodiment (Part 2)

FIGS. 15A and 15B are diagrams illustrating states in a case where a gain deviation occurs in the post-amplifier of the optical transmission device according to the embodiment. FIG. 15A illustrates states before the CH gain is corrected, and FIG. 15B illustrates states after the CH gain is corrected.

According to the embodiment, in the state before the CH gains are corrected in FIG. 15A, the CH gain deviation occurring in the post-amplifier 204 between the points (D) and (E) may be correctly detected in the "CH gain by device monitor" in FIG. 15A(b) (reference numeral 1501 part). In the "device monitor" between the points (D) and (E), CH1 and CHn may be detected for each CH by the optical CH power monitoring unit (OCM) 209 illustrated in FIG. 2. Thereby, due to the "CH gain by device monitor" between the points (A) and (E) of the ROADM 100, deviation of CH1 and CHn from the target gain (dotted line) may be detected (reference numeral 1502 part).

Thereafter, in the embodiment, in a state after the CH gains of FIG. 15B are corrected, the gain correction is performed by the ATT of the post-WSS 203 at the point (D) in FIG. 15B(a) (reference numeral 1503 part). Thereby, CH1 and CHn may coincide with the target gain (dotted line) as the "actual CH gain" at the points (A) to (E) in FIG. 15B(b). The relative gains of CH1 and CHn may be output in the same state as the "actual CH gain" output by the ROADM 1100 (reference numeral 1504 part).

As described above, according to the embodiment, even in a case where the gain deviation for each CH occurs in the pre-amplifier 201 and the post-amplifier 204, the gain deviation for each CH occurring in the pre-amplifier 201 and the post-amplifier 204 may be detected. By correcting the gain using the ATTs in the pre-WSS 202 and the post-WSS 203 corresponding to the pre-amplifier 201 and the post-amplifier 204, the output of the ROADM 100 may be controlled to have a steady gain between CHs.

In the above description, processing examples in a case where the gain deviation occurs in the pre-amplifier 201 or the post-amplifier 204 are illustrated, but, even in a case where the gain deviation occurs in the pre-amplifier 201 and the post-amplifier 204, the gain steady control may be performed.

Figure 16A:
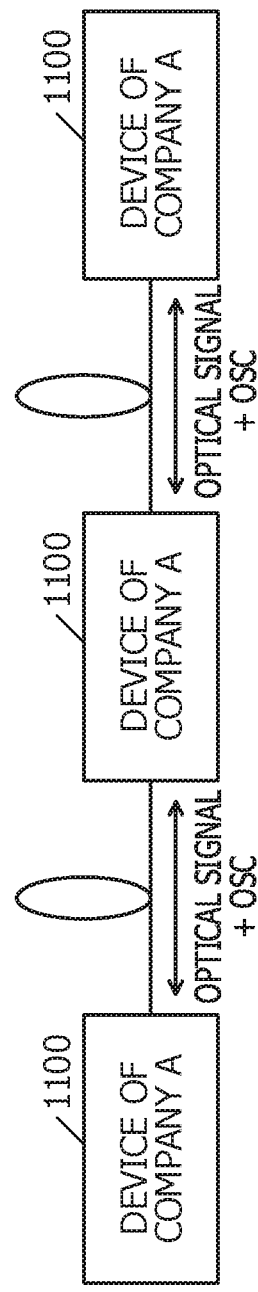
FIGS. 16A and 16B are diagrams illustrating states where the optical transmission devices of the related art are mutually connected for different companies.
Figure 16B:
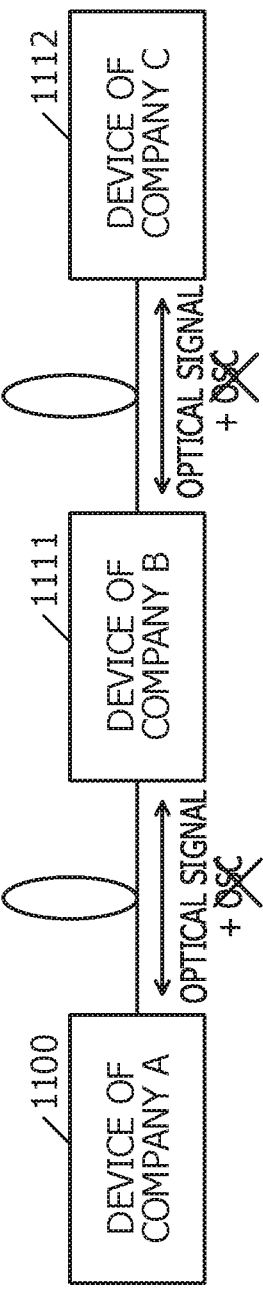

FIGS. 16A and 16B are diagrams illustrating states where the optical transmission devices of the related art are mutually connected for different companies. As illustrated in FIG. 16A, in the related art, in a case where the optical transmission devices 1100 of an own company (company A) are connected to each other, control information may be transmitted based on a predetermined format of OSC. For example, it is possible to acquire the control information of the adjacent optical transmission device 1100, such as the number of wavelengths, a wavelength disposition, WSS input/output CH power, WSS ATT, using the OSC. Thereby, in a case of an inter-company connection, it is possible to perform a steady control of an output power, based on the control information acquired via the OSC, even when the number of wavelengths varies.

Meanwhile, as illustrated in FIG. 16B, in the related art, in a case where the optical transmission device 1100 of the own company is connected to other companies (an optical transmission device 1111 of a company B and an optical transmission device 1112 of a company C), OSC formats and content of information differ from each other for each company. Accordingly, there is a limitation on the transmission of the control information, and the optical transmission device 1100 may not acquire the control information of the adjacent optical transmission device 1111 via the OSC.

Under such a state, in a case where the number of wavelengths varies, if the respective optical transmission devices 1100, 1111, and 1112 perform the control of stabilizing the output power simultaneously, large overshoot and undershoot occur, and there is a danger of damaging a transmission apparatus including the optical transmission device 1112.

In order to avoid the abnormality, a method of controlling a steady gain is considered. However, in a case of the device gain steady control, only the total power of the input and output of the optical transmission device 1100 may not be detected by the PD as described above, and thus, the device gain may not be correctly monitored, and the gain steady control may not be performed with high accuracy.

As described above, in a case where the optical transmission device is connected to the optical transmission devices of other companies, the respective optical transmission devices may not correctly monitor a gain between an input and an output, and, despite the fact that an actual gain does not reach a target gain, it is erroneously recognized that the actual gain reaches the target gain. In a WDM transmission system in which the optical transmission devices are connected in multiple stages on a transmission path, power deviation in each optical transmission device accumulates, which causes a problem of deterioration in signal quality.

In contrast to this, the optical transmission device according to the embodiment performs a gain steady control for each of a pre-amplifier and a post-amplifier and detects a gain deviation between wavelengths (between CHs) occurring in the pre-amplifier and the post-amplifier. The gain deviation between CHs is adjusted depending on an ATT change of WSS.

Thereby, there is no gain deviation between CHs and the gain steady control may be performed for the WDM signal which is input and output to and from the optical transmission device. In this case, even if control information is not transmitted from other adjacent optical transmission devices by OSC or the like as in the related art, the gain steady control with no gain deviation between CHs is performed within one optical transmission device. Thus, according to the optical transmission device of the embodiment, it is possible to perform the gain steady control without gain deviation between CHs in the respective optical transmission devices, even when the optical transmission devices of other companies are connected thereto. Also in the WDM transmission system in which the optical transmission devices are connected in multiple stages on the transmission path, power deviation in each optical transmission device is not accumulated and deterioration in signal quality may be suppressed.

In detecting the CH gain deviation, in addition to the split input of the optical signal at the input and output terminals of the existing WSS, light output for each CH may be detected by the optical CH power monitor unit (OCM), based on the split inputs of the optical signals at the front stage of the pre-amplifier and the rear stage of the post-amplifier. Thereby, it is possible to perform gain steady control of each CH of the WDM signal of the optical transmission device with a simple configuration.

The amount of ATT change in the WSS may be a value obtained by subtracting a target gain from a monitor gain. The gain steady control is not limited to being performed between an input and an output for the optical transmission device. For example, the gain steady control of the input and the output may be performed between each block provided in the optical transmission device, for example, between the pre-amplifier and the pre-WSS and between the post-WSS and the post-amplifier. It is also possible to perform the gain steady control on paths which are inserted and split for the optical transmission device. For example, it is also possible to perform the gain steady control of the input and output in the block of a path between the input and the DROP port through which an optical signal split by the optical transmission device passes, or a path between the ADD port and an output through which the optical signal inserted into the optical transmission device passes.

In a case where the pre-WSS and the post-WSS for ADD/DROP of the optical signal are provided as the WSS, the amount of ATT change may be distributed by the pre-WSS and the post-WSS. It is possible to perform gain adjustment for optical amplifiers (pre-amplifier and post-amplifier) together with the amount of ATT change with respect to the WSS.

The method relating to the gain control of the optical signal described in the present embodiment may be realized by a computer (such as a processor of the optical transmission device) of a target device or the like that executes a control program prepared in advance. This control program is recorded on a computer readable recording medium such as a magnetic disk, an optical disk, or an Universal Serial Bus (USB) flash memory, and is executed by being read from the recording medium by the computer. The control program may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission device comprising:
    a pre-amplifier configured to receive a first wavelength multiplexing signal and optically amplify the first wavelength multiplexing signal which is received;
    a pre-wavelength selective switch configured to attenuate each optical signal of the first wavelength multiplexing signal which is amplified by the pre-amplifier and split or transmit each optical signal of any wavelength of the first wavelength multiplexing signal;
    a post-wavelength selective switch configured to insert an optical signal and transmit a second wavelength multiplexing signal multiplexed the optical signal which is inserted and the optical signal which is transmitted by the pre-wavelength selective switch and attenuate each optical signal of the second wavelength multiplexing signal;
    a post-amplifier configured to receive the second wavelength multiplexing signal and optically amplify the second wavelength multiplexing signal which is received;
    an optical channel power monitor configured to detect power of each channel of the first wavelength multiplexing signal and the second wavelength multiplexing signal; and
    control circuitry configured to calculate a gain of each channel between the detected power of the each channel of the first wavelength multiplexing signal and the detected power of the each channel of the second wavelength multiplexing signal and adjust an amount of attenuation of the pre-wavelength selective switch or the post-wavelength selective switch based on the gain which is calculated.

2. The optical transmission device according to claim 1, wherein the control circuitry obtains a difference between the gain of each channel that is detected by the optical channel power monitor and a predetermined target gain and adjusts the amount of attenuation amount of each channel in accordance with the gain of difference.

3. The optical transmission device according to claim 1, wherein the control circuitry divides an inside of the device into a plurality of blocks in association with a path of the optical signal and adjusts the amount of attenuation of the pre-wavelength selective switch or the post-wavelength selective switch such that the gain between the each channel of the first wavelength multiplexing signal and the each channel of the second wavelength multiplexing signal is a predetermined value.

4. The optical transmission device according to claim 3, wherein the optical channel power monitor detects power of each channel of the optical signal on the path of the block in which the optical signal is inserted, split, or transmitted, and
wherein the control circuitry adjusts the amount of attenuation of the pre-wavelength selective switch or the post-wavelength selective switch such that the gain of a channel between the first wavelength multiplexing signal and the second wavelength multiplexing signal of the block in which the optical signal is inserted, split or transmitted is a predetermined value.

5. The optical transmission device according to claim 1, wherein an output power of the pre-amplifier is controlled to be a predetermined value,
wherein the pre-wavelength selective switch is provided at a rear stage of the pre-amplifier and the post-wavelength selective switch is provided at a front stage of the post-amplifier, and
wherein the control circuitry obtains a gain deviation of each channel of the optical signal that is generated by the pre-amplifier or the post-amplifier, and adjusts the amount of attenuation of at least one of the pre-wavelength selective switch and the post-wavelength selective switch such that the gain of each channel between the first wavelength multiplexing signal and the second wavelength multiplexing signal is a predetermined value, based on input and output powers of each channel in an input and an output terminal of the pre-amplifier and an input and output terminal of the post-amplifier.

6. The optical transmission device according to claim 1, wherein the control circuitry calculates the amount of power change in the optical signal of each channel in which the gain of each channel between the first wavelength multiplexing signal and the second wavelength multiplexing signal is a predetermined value, and adjusts the amount of attenuation of the wavelength selective switch and the gain of the optical amplifier, based on the power of each channel of the first wavelength multiplexing signal and the second wavelength multiplexing signal detected by the optical channel power monitor.

7. The optical transmission device according to claim 6, wherein the control circuitry adjusts the amount of attenuation of each channel of the pre-wavelength selective switch or the post-wavelength selective switch and the gain of the optical amplifier such that a sum of the amount of attenuation of the pre-wavelength selective switch or the post-wavelength selective switch and an amount of gain change in the optical amplifier becomes a difference between the gain that is detected by the optical channel power monitor and a predetermined target gain.

8. The optical transmission device according to claim 6, wherein the pre-wavelength selective switch is provided at a rear stage of the pre-amplifier and the post-wavelength selective switch is provided at a front stage of the post-amplifier, and
wherein the control circuitry obtains a gain deviation of each channel that occurs in the pre-amplifier or the post-amplifier, based on power of each channel in an input and output terminal of the pre-amplifier and an input and output terminal of the post-amplifier.

9. The optical transmission device according to claim 1, wherein the control circuitry adjusts the amount of attenuation of the pre-wavelength selective switch or the post-wavelength selective switch and a gain of the optical amplifier to control an output power of the device of each channel to be a predetermined value, based input and output powers of each channel, and
wherein, after the output power of the device of each channel reaches a target gain range, the control circuitry adjusts the amount of attenuation of the pre-wavelength selective switch or the post-wavelength selective switch and the gain of the pre-amplifier or the post-amplifier to control the gain between the input and the output of each channel of the device to be a predetermined value.

10. An optical signal gain control method of an optical transmission device including a pre-amplifier that receives a first wavelength multiplexing signal and optically amplifies the wavelength multiplexing signal which is received a pre-wavelength selective switch that attenuates each optical signal of the first wavelength multiplexing signal which is amplified by the pre-amplifier and splits or transmits each optical signal of the first wavelength multiplexing signal, a post-wavelength selective switch that inserts an optical signal and transmits a second wavelength multiplexing signal multiplexed the optical signal which is inserted and the optical signal which is transmitted by the pre-wavelength selective switch and attenuates each optical signal of the second wavelength multiplexing signal, a post-amplifier receives the second wavelength multiplexing signal and optically amplify the second wavelength multiplexing signal which is received, an optical channel power monitor that detects power of each channel of the first wavelength multiplexing signal and the second wavelength multiplexing signal, and control circuitry, the method comprising:
causing the control circuitry to calculate a gain of each channel between the detected power of the each channel of the first wavelength multiplexing signal and the detected power of the each channel of the second wavelength multiplexing signal; and
adjusting an amount of attenuation of the pre-wavelength selective switch or the post-wavelength selective switch based on the gain which is calculated.

11. The optical signal gain control method of an optical transmission device according to claim 10,
wherein the control circuitry obtains a difference between a gain of each channel that is detected by the optical channel power monitor and a predetermined target gain and adjusts the amount of attenuation amount of each channel in accordance with the gain of difference.

12. The optical signal gain control method of the optical transmission device according to claim 10,
wherein the control circuitry adjusts the amount of attenuation of each channel of the pre-wavelength selective switch or post-wavelength selective switch and the gain of the pre-amplifier or post-amplifier such that a sum of the amount of attenuation of the pre-wavelength selective switch or post-wavelength selective switch and an amount of gain change in the pre-amplifier or post-amplifier becomes a difference between a gain that is detected by the optical channel power monitor and a predetermined target gain.

* * * * *